United States Patent
Yang et al.

(10) Patent No.: US 11,736,062 B2
(45) Date of Patent: Aug. 22, 2023

(54) METHOD AND APPARATUS FOR DETERMINING OPERATING STATE OF PHOTOVOLTAIC ARRAY, DEVICE AND STORAGE MEDIUM

(71) Applicants: ENVISION DIGITAL INTERNATIONAL PTE. LTD., Singapore (SG); SHANGHAI ENVISION DIGITAL CO., LTD., Shanghai (CN)

(72) Inventors: Jinlin Yang, Shanghai (CN); Jing Chang, Shanghai (CN); Jie Sun, Shanghai (CN); Kang Jian, Shanghai (CN); Zhousheng Li, Shanghai (CN); Huirong Jiang, Shanghai (CN)

(73) Assignees: ENVISION DIGITAL INTERNATIONAL PTE. LTD., Singapore (SG); SHANGHAI ENVISION DIGITAL CO., LTD., Shanghai (CN)

( * ) Notice: Subject to any disclaimer, the term of this patent is extended or adjusted under 35 U.S.C. 154(b) by 0 days.

(21) Appl. No.: 17/910,955

(22) PCT Filed: Mar. 11, 2021

(86) PCT No.: PCT/SG2021/050126
§ 371 (c)(1),
(2) Date: Sep. 12, 2022

(87) PCT Pub. No.: WO2021/183054
PCT Pub. Date: Sep. 16, 2021

(65) Prior Publication Data
US 2023/0179145 A1      Jun. 8, 2023

(30) Foreign Application Priority Data
Mar. 13, 2020  (CN) .......................... 202010177188.2

(51) Int. Cl.
*H02S 50/10* (2014.01)
(52) U.S. Cl.
CPC .................................... *H02S 50/10* (2014.12)
(58) Field of Classification Search
CPC ...................................................... H02S 50/10
See application file for complete search history.

(56) References Cited

U.S. PATENT DOCUMENTS

| | | | |
|---|---|---|---|
| 9,209,743 B2 | 12/2015 | Hasegawa et al. | |
| 2012/0310427 A1* | 12/2012 | Williams | ........... G05B 23/0218 702/182 |

(Continued)

FOREIGN PATENT DOCUMENTS

| | | |
|---|---|---|
| CN | 106357217 A | 1/2017 |
| CN | 107181461 A | 9/2017 |

(Continued)

OTHER PUBLICATIONS

International Search Report and Written Opinion, dated Jun. 25, 2021, pp. 1-9, issued in International Application No. PCT/SG2021/050126, Intellectual Property Office of Singapore, Paya Lebar Quarter, Singapore.

(Continued)

*Primary Examiner* — Son T Le
*Assistant Examiner* — Adam S Clarke
(74) *Attorney, Agent, or Firm* — Crowell & Moring LLP; John C. Freeman

(57) ABSTRACT

A method including: acquiring present operating state data of a photovoltaic array, wherein the photovoltaic array includes at least two photovoltaic strings in parallel, and the present operating state data includes present output current values of the photovoltaic strings and present irradiances corresponding to the photovoltaic strings. Determining present characteristic parameters of the photovoltaic array based (Continued)

Photovoltaic array 101

Sending operating state data of the photovoltaic array →

Monitoring platform 102 on the present operating state data, wherein the present characteristic parameters include a present characteristic current value, a present current discrete rate and the present irradiances; and determining an operating state of the photovoltaic array by comparing the present characteristic parameters with standard characteristic parameters of the photovoltaic array. Determining a present operating state of a photovoltaic array by comparing present characteristic parameters determined based on real-time operating state data with standard characteristic parameters may improve the accuracy of determining the operating state of the photovoltaic array.

22 Claims, 9 Drawing Sheets

(56) References Cited

U.S. PATENT DOCUMENTS

| | | | |
|---|---|---|---|
| 2015/0162748 A1* | 6/2015 | Reder | G08B 13/1418 |
| | | | 307/52 |
| 2016/0190984 A1 | 6/2016 | Caine | |
| 2019/0140589 A1* | 5/2019 | Yen | H02S 50/00 |

FOREIGN PATENT DOCUMENTS

| | | |
|---|---|---|
| CN | 109450376 A | 3/2019 |
| CN | 110389949 A | 10/2019 |
| CN | 108964606 B | 12/2019 |
| JP | 2017-017791 A | 1/2017 |
| JP | 2018-190281 A | 11/2018 |
| KR | 10-2021311 B1 | 9/2019 |

OTHER PUBLICATIONS

International Preliminary Report on Patentability dated Feb. 3, 2022 (21 pages) issued in International Application No. PCT/SG2021/050126, Intellectual Property Office of Singapore, Paya Lebar Quarter, Singapore.
Office Action dated Nov. 15, 2022 (12 pages) out of corresponding Korean patent application No. 10-2022-7034874.
Extended Search Report dated May 3, 2023 out of corresponding EP Application 21768379.6 (six pages).
Substantive Examination Clear Report (one page) dated May 31, 2023 issued to the corresponding Malaysian patent application PI2022004866.

* cited by examiner

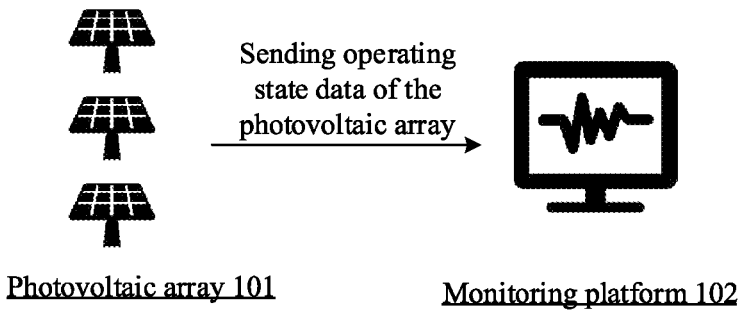

Photovoltaic array 101 — Sending operating state data of the photovoltaic array → Monitoring platform 102

FIG. 1

Acquiring present operating state data of a photovoltaic array, wherein the photovoltaic array includes at least two photovoltaic strings in parallel, and the present operating state data includes present output current values of the photovoltaic strings and present irradiances corresponding to the photovoltaic strings — 201

Determining present characteristic parameters of the photovoltaic array based on the present operating state data, wherein the present characteristic parameters are intended to characterize characteristics of a present operating state of the photovoltaic array, and the present characteristic parameters includes a present characteristic current value, a present current discrete rate and the present irradiances — 202

Determining an operating state of the photovoltaic array by comparing the present characteristic parameters with standard characteristic parameters of the photovoltaic array — 203

FIG. 2

METHOD AND APPARATUS FOR DETERMINING OPERATING STATE OF PHOTOVOLTAIC ARRAY, DEVICE AND STORAGE MEDIUM

This application is a national application based on Patent Cooperation Treaty Patent Application No. PCT/SG2021/050126, filed on Mar. 11, 2021, the entire contents of which are incorporated herein by reference.

This application claims under 35 U.S.C. § 119(a) the benefit of the filing date of Chinese Patent Application No. 202010177188.2, filed on Mar. 13, 2020, the entire contents of which are incorporated herein by reference.

BACKGROUND OF THE INVENTION
TECHNICAL FIELD

Field of Invention

Embodiments of the present disclosure relate to the field of photovoltaic technologies, and in particular relate to a method and an apparatus for determining an operating state of a photovoltaic array, a device and a storage medium.

Description of Related Art

An output current of a photovoltaic module may be reduced during actual operation of a photovoltaic station due to problems such as partial shade shielding, serious dust accumulation in some areas, or failure of some photovoltaic assemblies, which may cause a significant mismatch of an output current of a photovoltaic string, and thus bringing power generation loss to the photovoltaic station.

In the related arts, the temperature of the photovoltaic module may be too high or too low due to a failure of a photovoltaic module, such that a color of the failed photovoltaic module in an infrared image is different from those of other normal photovoltaic assemblies. Therefore, images of the photovoltaic assemblies may be acquired with an infrared image acquisition device equipped on a drone, and the operating state of a photovoltaic module in a photovoltaic array may be determined based on the acquired infrared images.

However, the acquired infrared images can be easily affected by environmental factors of the station, such as the ambient temperature of the station, such that the discrimination between the failed photovoltaic module and the normal photovoltaic module in the infrared image is low, and thus the accuracy of determining the operating state of the photovoltaic array is low.

SUMMARY

Embodiments of the present disclosure provide a method and an apparatus for determining an operating state of a photovoltaic array, a device and a storage medium.

In a first aspect, a method for determining an operating state of a photovoltaic array is provided by an embodiment of the present disclosure. The method includes:

acquiring present operating state data of a photovoltaic array, wherein the photovoltaic array includes at least two photovoltaic strings in parallel, and the present operating state data includes present output current values of the photovoltaic strings and present irradiances corresponding to the photovoltaic strings;

determining present characteristic parameters of the photovoltaic array based on the present operating state data, wherein the present characteristic parameters are intended to characterize characteristics of a present operating state of the photovoltaic array, and the present characteristic parameters include a present characteristic current value, a present current discrete rate and the present irradiances; and determining an operating state of the photovoltaic array by comparing the present characteristic parameters with standard characteristic parameters of the photovoltaic array, wherein the standard characteristic parameters are determined based on historical operating state data of the photovoltaic array, and the standard characteristic parameters include a standard characteristic current value, a standard current discrete rate and a standard irradiance corresponding to the photovoltaic string.

In a second aspect, an apparatus for determining an operating state of a photovoltaic array is provided by an embodiment of the present disclosure. The apparatus includes:

a first acquiring module, configured to acquire present operating state data of a photovoltaic array, wherein the photovoltaic array includes at least two photovoltaic strings in parallel, and the present operating state data includes present output current values of the photovoltaic strings and present irradiances corresponding to the photovoltaic strings;

a first determining module, configured to determine present characteristic parameters of the photovoltaic array based on the present operating state data, wherein the present characteristic parameters are intended to characterize characteristics of a present operating state of the photovoltaic array, and the present characteristic parameters include a present characteristic current value, a present current discrete rate and the present irradiances; and a second determining module, configured to determine an operating state of the photovoltaic array by comparing the present characteristic parameters with standard characteristic parameters of the photovoltaic array, wherein the standard characteristic parameters are determined based on historical operating state data of the photovoltaic array, and the standard characteristic parameters include a standard characteristic current value, a standard current discrete rate and a standard irradiance corresponding to the photovoltaic string.

In a third aspect, a computer device including a processor and a memory is provided by an embodiment of the present disclosure. The memory stores at least one instruction, at least one program, a code set or an instruction set therein. The at least one instruction, the at least one program, the code set or the instruction set, when loaded and executed by the processor, causes the processor to perform the method for determining the operating state of the photovoltaic array according to the above aspects.

In a fourth aspect, a computer-readable storage medium is provided by an embodiment of the present disclosure. The computer-readable storage medium stores at least one instruction, at least one program, a code set or an instruction set therein. The at least one instruction, the at least one program, the code set or the instruction set, when loaded and executed by a processor, causes the processor to perform the method for determining the operating state of the photovoltaic array according to the above aspects.

The technical solution according to the embodiments of the present disclosure may achieve at least the following beneficial effects.

Present operating state data of a photovoltaic array (a present output current value of a photovoltaic string and a present irradiance corresponding to the photovoltaic string)

is acquired, present characteristic parameters of the photovoltaic array (a present characteristic current value, a present current discrete rate and a present irradiance) are determined based on the present operating state data, and the present characteristic parameters with standard characteristic parameters of the photovoltaic array (a standard characteristic current value, a standard current discrete rate and a standard irradiance), so as to determine an operating state of the photovoltaic array. A present operating state of a photovoltaic array is determined based on comparing present characteristic parameters determined based on real-time operating state data with standard characteristic parameters. Since present characteristic parameters can reflect operating state characteristics of a photovoltaic array in real-time, compared to a method for determining an operating state through an infrared image in the related arts, the interference of the ambient temperature on the infrared image can be avoided, thereby improving the accuracy of determining the operating state of the photovoltaic array.

BRIEF DESCRIPTION OF THE DRAWINGS

FIG. 1 shows a schematic diagram of an implementation environment according to an exemplary embodiment of the present disclosure;

FIG. 2 shows a flowchart of a method for determining an operating state of a photovoltaic array according to an exemplary embodiment of the present disclosure;

DETAILED DESCRIPTION

Figure 3:
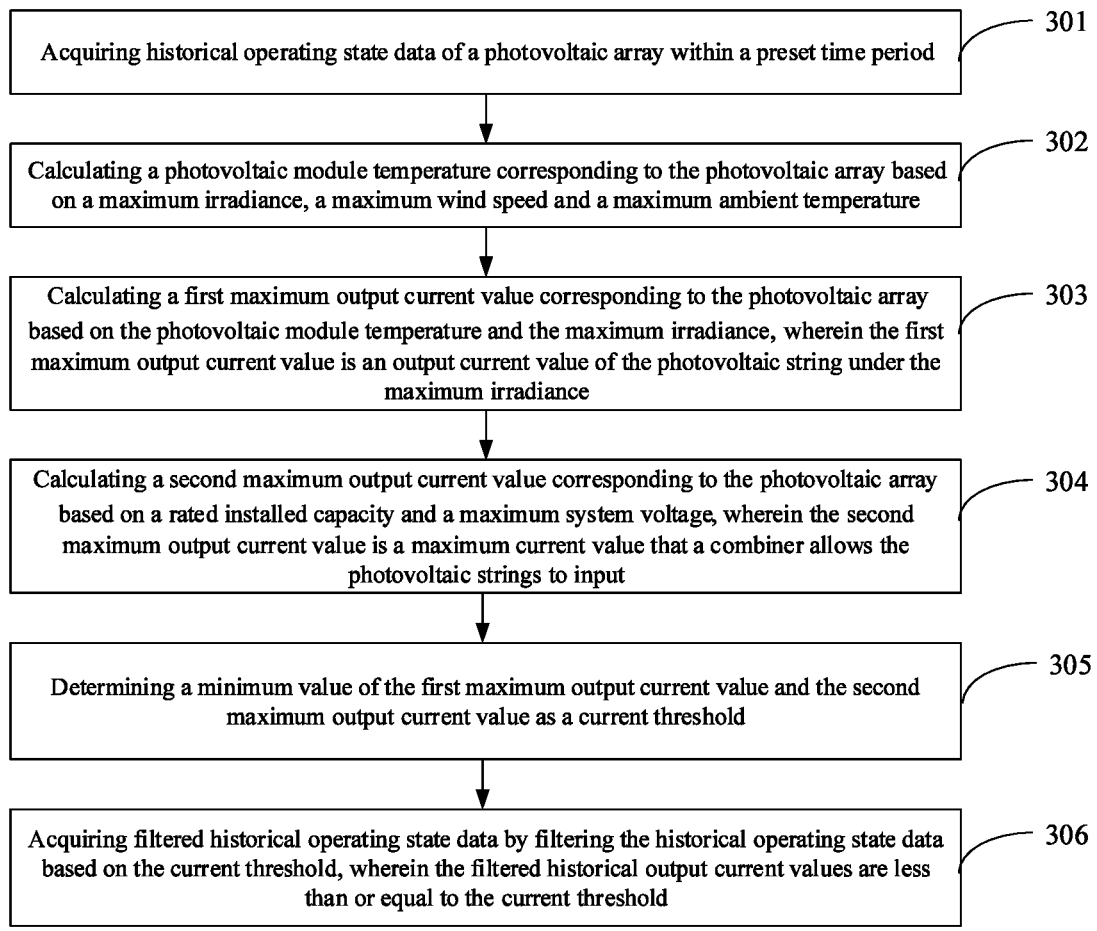
FIG. 3 shows a flowchart of a method for preprocessing historical operating state data according to an exemplary embodiment of the present disclosure.

In order to make the objectives, technical solutions, and advantages of the present disclosure clearer, the implementations of the present disclosure will be further described in detail below in combination with the accompanying drawings.

The term "a plurality of" mentioned herein means two or more, and the term "and/or" describes an association relationship of associated objects, indicating that there may be three types of relationships. For example, A and/or B may indicate three situations: A exists alone, A and B exist simultaneously, and B exists alone. The character "/" generally indicates that the contextual associated objects are in an "or" relationship.

When a photovoltaic module fails, there may be two situations. One situation is that the photovoltaic module is damaged or the photovoltaic module is shielded, which causes the photovoltaic module temperature to rise. Another situation is that the photovoltaic module is short-circuited due to a bypass diode, i.e., the photovoltaic module does not operate, which causes that the photovoltaic module temperature is low. Due to the difference in temperature between a normal photovoltaic module and a failed photovoltaic module, the related arts provide a method for determining an operating state of a photovoltaic module. Photovoltaic assemblies in a photovoltaic station are inspected with a drone equipped with an infrared image acquisition device. In this method, the operating state of the photovoltaic module is determined based on the acquired infrared images.

Regarding the method in the related arts, since the infrared image is greatly affected by temperature, when the ambient temperature of the photovoltaic station is high or low, it may not be able to distinguish between a normal photovoltaic module and a failed photovoltaic module, resulting in missed or false alarms, which makes the accuracy of determining the operating state of the photovoltaic module relatively low.

In order to solve the above problem, a method for determining an operating state of a photovoltaic array is provided by an embodiment of the present disclosure. Refer to FIG. 1, which shows a schematic diagram of an implementation environment according to an exemplary embodiment of the present disclosure. The implementation environment includes a photovoltaic array 101 and a monitoring platform 102.

The photovoltaic array 101 is a photovoltaic power generation system formed by a plurality of photovoltaic strings in parallel, and refers to a set of all photovoltaic strings connected to a single combiner. An actual photovoltaic station includes a plurality of photovoltaic arrays 101. A current output by each photovoltaic string in the photovoltaic array 101 is combined by the combiner and then transmitted to an inverter. Usually, there are 8-16 photovoltaic strings in parallel in a photovoltaic array, and 24 photovoltaic assemblies in series in each photovoltaic string. In the embodiments of the present disclosure, the photovoltaic array 101 may be provided with a sensor that acquires operating state data of the photovoltaic array, such as a current sensor and a current transformer that acquire an output current of the photovoltaic string, and may send the acquired operating state data to the monitoring platform 102.

The photovoltaic array 101 and the monitoring platform 102 are connected through a wired or wireless network.

The monitoring platform 102 is a computer device with functions such as storing operating state data sent by the photovoltaic array 101, processing the data, and generating alarm records. The computer device may be a server, a server cluster composed of several servers, or a cloud server. In the embodiments of the present disclosure, the monitoring platform 102 may acquire operating state data sent by the photovoltaic array 101, obtain present characteristic parameters by analyzing and processing the operating state data to, and compare the present characteristic parameters with standard characteristic parameters, so as to determine an operating state of the photovoltaic array. Optionally, the monitoring platform 102 may also store the acquired operating state data in a database, so as to subsequently continuously update the standard characteristic parameters based on the operating state data. In a possible implementation, upon determining that an abnormal photovoltaic string exists in the photovoltaic array, the monitoring platform 102 may generate an alarm record, so that the operation and maintenance personnel may learn the operating state of the photovoltaic array in time, and may solve the abnormal operating state problem of the photovoltaic string in time when there is a failure.

For ease of description, in the following method embodiments, the monitoring platform 102 being a computer device is merely taken as an example for introduction and illustration.

Refer to FIG. 2, which shows a flowchart of a method for determining an operating state of a photovoltaic array according to an exemplary embodiment of the present disclosure. The method applicable to a computer device is taken as an example for illustration in the present embodiment and may include the following steps.

In step 201, present operating state data of a photovoltaic array is acquired, wherein the photovoltaic array includes at least two photovoltaic strings in parallel, and the present operating state data includes present output current values of the photovoltaic strings and present irradiances corresponding to the photovoltaic strings.

Since the photovoltaic array is a photovoltaic power generation system formed by a plurality of photovoltaic strings in parallel, determining the operating state of the photovoltaic array is to determine the operating state of each photovoltaic string. Therefore, in a possible implementation, the acquired present operating state data includes a present output current value of each photovoltaic string and a present irradiance corresponding to the photovoltaic string.

As to the present output current value of the photovoltaic string, an induction coil may be adopted to detect the present output current of the photovoltaic string and may send the acquired present output current value to the computer device. Each photovoltaic string corresponds to a present output current value. The number of present output current values at a same sampling moment depends on the number of photovoltaic strings included in a photovoltaic array. For example, if a photovoltaic array includes 8 photovoltaic strings, the present output current values corresponding to the same sampling moment may include: $I_1$, $I_2$, $I_3$, $I_4$, $I_5$, $I_6$, $I_7$, and $I_8$.

The present irradiance corresponding to the photovoltaic string may be acquired by an irradiator equipped in the photovoltaic station. An installation manner of the irradiator may be horizontal installation (i.e., horizontal irradiator). Irradiance data acquired by the horizontal irradiator needs to be converted into irradiance data corresponding to an inclination of the photovoltaic array. An installation manner with a same inclination and a same orientation as the photovoltaic array (inclination irradiator) may also be adopted. The irradiance acquired by this installation manner is the present irradiance corresponding to the photovoltaic string. Since photovoltaic assemblies in a photovoltaic array all adopt the same inclination, the same acquisition moment corresponds to one present irradiance. Schematically, the present irradiance may be 900 W/m².

Optionally, the present operating state data may be acquired every preset time. The preset time may be 30 s or 5 min, which may be set by the operation and maintenance personnel of the photovoltaic station as needed. The acquisition time interval of the present operating state data is not limited in the embodiments of the present disclosure.

In step 202, present characteristic parameters of the photovoltaic array are determined based on the present operating state data, wherein the present characteristic parameters are intended to characterize characteristics of a present operating state of the photovoltaic array, and the present characteristic parameters include a present characteristic current value, a present current discrete rate and the present irradiances.

In a possible implementation, in order to judge the operating state of the photovoltaic array more accurately, the present characteristic parameters (characteristics intended to characterize the present operating state of the photovoltaic array) needs to be determined by processing the present operating state data. For example, the present characteristic current value characterizes an output current value corresponding to a photovoltaic string under a normal operating state among all photovoltaic strings included in the photovoltaic array. The present current discrete rate characterizes the power generation performance of each photovoltaic string included in the photovoltaic array. If the present current discrete rate is low, it indicates that the power generation performance uniformity of each photovoltaic string is good (that is, the deviation of the output current value of each photovoltaic string is small). If the present current discrete rate is high, it indicates the deviation of the output current value of each photovoltaic string is large and the power generation performance is poor. A failed photovoltaic module may exist in a certain photovoltaic string.

Schematically, the present characteristic current value may be represented by $I_K$, the present current discrete rate may be represented by $CV_t$, and the present irradiance may be represented by $POA_t$.

In step 203, an operating state of the photovoltaic array is determined by comparing the present characteristic parameters with standard characteristic parameters of the photovoltaic array.

The standard characteristic parameters are determined based on historical operating state data of the photovoltaic array. Schematically, historical operating state data corresponding to the photovoltaic array within a period of time may be acquired, such as a historical output current value, a historical irradiance, or the like.

Optionally, historical operating state data corresponding to the photovoltaic array within 6 months may be acquired for obtain the standard characteristic parameters corresponding to the photovoltaic array by analysis.

In a possible implementation, by analyzing the historical operating state data corresponding to the photovoltaic array, the standard characteristic parameters corresponding to the photovoltaic array may be obtained, such as a standard characteristic current value ($I_{ref}$), a standard current discrete rate ($CV_{ts}$) and a standard irradiance ($POA_{ref}$), or the like, corresponding to the photovoltaic string. Then, the obtained standard characteristic parameters are compared with the present characteristic parameters. If a preset logic relationship is satisfied, it is output that the operating state of the photovoltaic array is normal. If the preset logic relationship is not satisfied, it is output that the operating state of the photovoltaic array is abnormal.

The preset logical relationship may be that the present characteristic current value is less than or equal to the standard characteristic current value ($I_K \lesssim I_{ref}$), the present irradiance is less than or equal to the standard irradiance ($POA_t \lesssim POA_f$), the present current discrete rate is less than or equal to the standard current discrete rate ($CV_t \lesssim CV_{ts}$), or the like.

In summary, in the embodiments of the present disclosure, present operating state data of a photovoltaic array (a present output current value of a photovoltaic string and a present irradiance corresponding to the photovoltaic string) is acquired in real-time, present characteristic parameters of the photovoltaic array (a present characteristic current value, a present current discrete rate and a present irradiance) are determined based on the present operating state data, and compare the present characteristic parameters with standard characteristic parameters of the photovoltaic array (a standard characteristic current value, a standard current discrete rate and a standard irradiance), so as to determine an operating state of the photovoltaic array. A present operating state of a photovoltaic array is determined by comparing present characteristic parameters determined based on real-time operating state data with standard characteristic parameters. Since present characteristic parameters can reflect operating state characteristics of a photovoltaic array in real-time, compared to a method for determining an operating state through an infrared image in the related arts, the interference of the ambient temperature on the infrared image can be avoided, thereby improving the accuracy of determining the operating state of the photovoltaic array.

In a possible implementation, the standard characteristic parameters are determined based on the acquired historical operating state data corresponding to the photovoltaic array. Since there may be some abnormal or invalid data in the historical operating state data, for example, operating state data at night (invalid data), or data acquired when the combiner fails (or equipment that acquires the output current value fails) (abnormal data), which will all affect the accuracy of determining the standard characteristic parameters. Therefore, in order to improve the accuracy of the determined standard characteristic parameters, the acquired historical operating state data needs to be filtered and processed according to certain data quality rules. The present embodiment focuses on describing how to filter and process the acquired historical operating state data.

Schematically, FIG. 3 shows a flowchart of a method for preprocessing historical operating state data according to an exemplary embodiment of the present disclosure.

In step 301, historical operating state data of a photovoltaic array within a preset time period is acquired.

The historical operating state data includes historical output current values of photovoltaic strings, historical irradiances corresponding to the photovoltaic strings, historical ambient temperatures and historical wind speeds of the environment where the photovoltaic strings are located.

The preset time period may be the recent 6 months, or the recent 1 year. The longer the preset time period is, the more accurate the standard characteristic parameters determined based on the historical operating state data are.

In a possible implementation, historical output current values, historical irradiances, historical ambient temperatures, historical wind speeds, or the like of the photovoltaic array within the recent 6 months may be acquired. As to the methods for acquiring the historical output current values and the historical irradiances, reference may be made to the above embodiment, which are not repeated in the present embodiment. The historical ambient temperatures and the historical wind speeds may be acquired by a temperature sensor and an anemometer installed in the photovoltaic station respectively.

Optionally, the historical operating state data may be acquired based on a preset sampling frequency. For example, the preset sampling frequency is 5 min. The sampling frequency may be the same as a sampling frequency for acquiring the present operating state data.

In step 302, a photovoltaic module temperature corresponding to the photovoltaic array is calculated based on a maximum irradiance, a maximum wind speed and a maximum ambient temperature.

The maximum irradiance is determined based on the historical irradiances. That is, a maximum value of all historical irradiances within an acquisition period is regarded as the maximum irradiance. The maximum ambient temperature is determined based on the historical ambient temperatures. That is, a maximum value of all historical ambient temperatures within the acquisition period is regarded as the maximum ambient temperature. The maximum wind speed is determined based on the historical wind speeds. That is, a maximum value of all historical wind speeds within the acquisition period is regarded as the maximum wind speed.

Schematically, a relationship among the irradiance, the wind speed, the ambient temperature and the photovoltaic module temperature may be expressed as:

$$T_m = G_{POA} \exp(a+bW_s)T_a \quad (1)$$

wherein $T_m$, is the photovoltaic module temperature (the temperature of the back panel of the photovoltaic module), $G_{POA}$ is the irradiance (which corresponds to the inclination of the photovoltaic array), $W_s$ is the wind speed of the environment where the photovoltaic module is located, $T_a$ represents the ambient temperature of the environment where the photovoltaic module is located, and a and b are constants. The values of a and b are different depending on the type and the installation manner of the photovoltaic module. For specific values, see Table I:

TABLE I

| Assembly type | Installation manner | a | b |
|---|---|---|---|
| Dual-glass assembly | Fixed inclination | −3.47 | −0.0594 |
| Dual-glass assembly | Fixed inclination | −2.98 | −0.0471 |
| Conventional assembly | Fixed inclination | −3.56 | −0.075 |
| Conventional assembly | Color steel tile | −2.81 | −0.0455 |
| Thin-film assembly | Fixed inclination | −3.58 | −0.113 |

In a possible implementation, the photovoltaic module temperature $T_m$ is obtained by substituting the acquired maximum wind speed, maximum ambient temperature, and maximum irradiance into formula (1).

In step 303, a first maximum output current value corresponding to the photovoltaic array is calculated based on the photovoltaic module temperature and the maximum irradiance, wherein the first maximum output current value is an output current value of the photovoltaic string under the maximum irradiance.

Schematically, a relationship among the output current, the photovoltaic module temperature, and the irradiance may be expressed as:

$$I_1 = \frac{I_{ph,stc} G_{POA}}{1000}[1 + \beta(T_m - T_{stc})] \quad (2)$$

wherein $I_1$ is the output current, $I_{ph,stc}$ is the output current under a standard test condition; $G_{POA}$ is the inclination irradiation, $\beta$ is a current temperature rise coefficient of the photovoltaic module, $T_m$ is the photovoltaic module temperature (the temperature of the back panel of the photovoltaic module); and $T_{stc}$ is the temperature under the standard test condition, namely 25° C.

Standard test condition (STC) refers to a recognized test standard for photovoltaic assemblies in the photovoltaic field, namely 1.5; 1000 W/m²; 25° C. 1.5 refers to that the air mass (AM) is 1.5, that is, the actual distance that the light passes through the atmosphere is 1.5 times the vertical thickness of the atmosphere. 1000 W/m² is the irradiance of the sun under the standard test. 25° C. refers to that the photovoltaic module operates at 25° C.

In a possible implementation, since $I_{ph,stc}$, $\beta$, $T_{stc}$ and the like are default values, the first maximum current value $I_1$ corresponding to the photovoltaic array may be obtained by substituting the photovoltaic module temperature $T_m$ and the maximum irradiance acquired in step 302 into formula (2).

In step 304, a second maximum output current value corresponding to the photovoltaic array is calculated based on a rated installed capacity and a maximum system voltage, wherein the second maximum output current value is a maximum current value that a combiner allows the photovoltaic strings to input.

The rated installed capacity is a rated power of the combiner connected to the photovoltaic array. The maximum system voltage is a system voltage of an inverter connected to the combiner.

Schematically, a relationship among the rated installed capacity, the maximum system voltage and the second maximum output current may be expressed as:

$$I_2 = \frac{2P_{cbx,rated}}{V_{inv.max\_system}} \quad (3)$$

wherein $P_{cbx,rated}$ is the rated installed capacity of the combiner, $V_{inv,max\_system}$ is the maximum system voltage of the inverter, and $I_2$ is the second maximum output current. From formula (3), it may be seen that the second maximum output current has nothing to do with the historical operating data of the photovoltaic array. That is, for the same combiner, the second maximum output current is fixed.

In a possible implementation, the second maximum output current value, i.e., $I_2$, may be obtained by calculating based on the rated installed capacity of the combiner and the maximum system voltage of the inverter.

In step 305, a minimum value of the first maximum output current value and the second maximum output current value is determined as a current threshold.

In a possible implementation, a minimum value of the first maximum output current and the second maximum output current value is determined as a current threshold. For example, the current threshold may be 15A. If the acquired output current value of the photovoltaic string is higher than the current threshold, it indicates that the output current value corresponding to the photovoltaic string is virtually high. The reason for the current value being virtually high may be a problem with the combiner device or a failure of an induction coil detecting the current of the photovoltaic string, which does not belong to a range of the photovoltaic string failure. Therefore, it is necessary to filter the historical operating state data based on the determined current threshold to remove the virtually high current value.

Schematically, the current threshold may be represented by $I_{threshold}$. A relationship among the current threshold, the first maximum output current value $I_1$ and the second maximum output current value $I_2$ may be expressed as (taking a minimum value of $I_1$ and $I_2$):

$I_{threshold}$=min $(I_1,I_2)$

Schematically, if $I_1$=15A and $I_2$=15.5A, then the current threshold $I_{threshold}$=15A.

In step 306, filtered historical operating state data is obtained by filtering the historical operating state data based on the current threshold, wherein the filtered historical output current values are less than or equal to the current threshold.

In a possible implementation, the historical operating state data may be filtered according to preset data quality rules. The data quality rules may include: removing night data (for example, removing data before 7 am and after 6 pm), removing repeated timestamp data, removing data exceeding the current threshold, removing data within a time period when the combiner is not connected (the combiner is shut down), removing stuck data (stuck data refers to that the data is not refreshed for more than a preset time, for example, more than 10 minutes), removing data with irradiance less than 20 W/m², supplementing vacancy values, and the like.

After removing the data exceeding the current threshold, a current vacancy value corresponding to the acquisition moment needs to be supplemented. A current average of effective time points before and after the acquisition moment corresponding to the vacancy value may be regarded as a filling value instead of the vacancy value. For example, a current value corresponding to 10:05:00 is 20A, which is greater than the current threshold 15A. A current value acquired at 10:00:00 is 12A, which is less than the current threshold 15A. A current value acquired at 10:10:00 is 10A, which is also less than the current threshold 15A. Then a current average value of 11A may be regarded as an output current value corresponding to 10:05:00.

In a possible implementation, the historical operating state data after being processed by the preset data quality rules are regarded as basic data for determining the standard characteristic parameters.

In the present embodiment, historical operating state data corresponding to a photovoltaic array within a preset time period is acquired for obtaining a current threshold corresponding to the photovoltaic array by analysis, so as to filter and process the historical operating state data according to preset data quality rules, thereby improving the accuracy of determining standard characteristic parameters.

In a possible implementation, after preprocessing the historical operating state data acquired within the preset time period, standard characteristic parameters may be determined based on the filtered historical operating state data.

Figure 4:
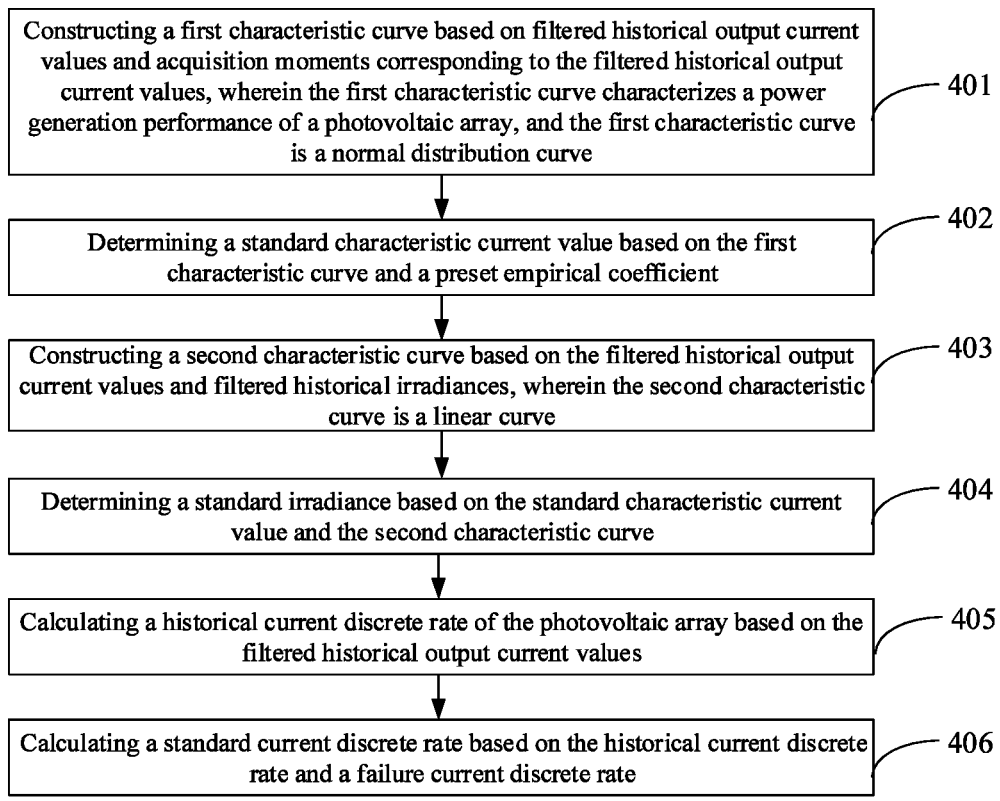
FIG. 4 shows a flowchart of a method for determining standard characteristic parameters according to an exemplary embodiment of the present disclosure.

Schematically, FIG. 4 shows a flowchart of a method for determining standard characteristic parameters according to an exemplary embodiment of the present disclosure. The method includes the following steps.

In step 401, a first characteristic curve is constructed based on filtered historical output current values and acquisition moments corresponding to the filtered historical output current values, wherein the first characteristic curve characterizes a power generation performance of a photovoltaic array, and the first characteristic curve is a normal distribution curve.

In a possible implementation, historical output current values within a preset time period are acquired. Taking the preset time period being 6 months as an example, there may be 6×30 historical output current values corresponding to a same acquisition moment. For the convenience of fitting the characteristic curve, firstly a K percentile is taken for the 180 historical output current values. A historical output current value corresponding to the K percentile is regarded as a historical output current value corresponding to the acquisition moment, and K is greater than 50. That is, the historical output current value above the median is taken. According to the above steps, the historical output current value corresponding to each acquisition moment in a day may be determined, so as to construct the first characteristic curve based on the historical output current values and the corresponding acquisition moments. The first characteristic curve is a normal distribution curve, and may be expressed as:

$$f(t) = \frac{1}{\sigma\sqrt{2\pi}}\exp\left(-\frac{(t-\mu)^2}{2\sigma^2}\right)$$

wherein f(t) represents the historical output current value corresponding to moment t, t is the acquisition moment, μ and σ are two uncertain constants corresponding to the first characteristic curve, μ is determined by an average of the historical output current values, and σ is determined by a standard deviation of the historical output current values.

Figure 5:
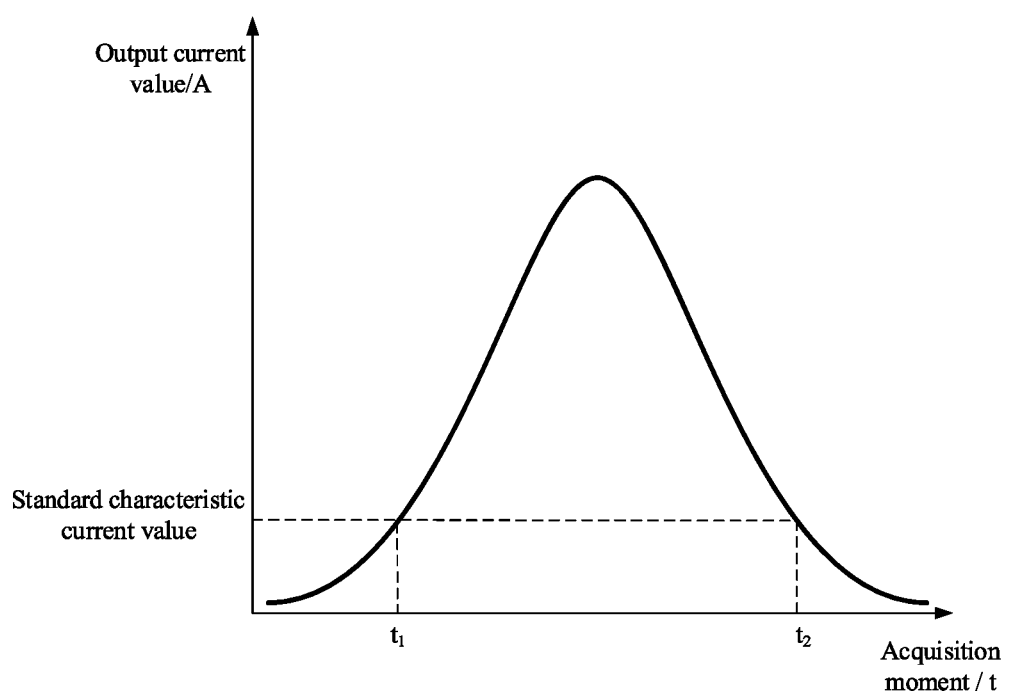
FIG. 5 shows a schematic diagram of a first characteristic curve according to an exemplary embodiment of the present disclosure.

Schematically, FIG. 5 shows a schematic diagram of a first characteristic curve according to an exemplary embodiment of the present disclosure. The abscissa is the acquisition moment, and the ordinate is the historical output current value. An area enclosed by the first characteristic curve and the abscissa axis may characterize a power generation performance of a photovoltaic string in a day.

In step 402, a standard characteristic current value is determined based on the first characteristic curve and a preset empirical coefficient.

The preset empirical coefficient may be set by the operation and maintenance personnel. For example, the preset empirical coefficient may be 80%, which means that a ratio of an area under the curve corresponding to the standard characteristic current value to a total area under the curve satisfies the preset empirical coefficient.

Schematically, as shown in FIG. 5, the standard characteristic current value corresponds to two acquisition moments $t_1$ and $t_2$. A ratio of an area under the curve enclosed by the curve between $t_1$ and $t_2$ and the abscissa to the area enclosed by the first characteristic curve and the abscissa axis satisfies the empirical coefficient 80%.

In a possible implementation, the operation and maintenance personnel sets a corresponding empirical coefficient in advance. A computer device may calculate a standard characteristic current value that satisfies the preset empirical coefficient based on the constructed first characteristic curve.

In step 403, a second characteristic curve is constructed based on the filtered historical output current values and filtered historical irradiances, wherein the second characteristic curve is a linear curve.

As to the method for determining historical irradiances corresponding to a same acquisition moment, reference may be made to the method in step 401. A K percentile is taken for historical irradiances at the same acquisition moment within 6 months, and K is an integer greater than 50. That is, irradiance above the median is taken.

In a possible implementation, a historical output current value corresponding to each acquisition moment in a day is determined based on the filtered historical output current values. A historical irradiance corresponding to each acquisition moment in a day is determined based on the filtered historical irradiances. Then, a second characteristic curve is constructed based on the historical output current value corresponding to each acquisition moment of the day and the historical irradiance corresponding to each sampling moment of the day. The second characteristic curve is a linear curve.

In step 404, a standard irradiance is determined based on the standard characteristic current value and the second characteristic curve.

In a possible implementation, a standard irradiance corresponding to the standard characteristic current value may be obtained by substituting the standard characteristic current value determined based on step 402 into the second characteristic curve.

In step 405, a historical current discrete rate of the photovoltaic array is calculated based on the filtered historical output current values.

In a possible implementation, for the same photovoltaic string, the method for acquiring historical output current values corresponding to the same acquisition moment may be made reference to step 401. That is, a K percentile is taken for 180 historical output current values, which are not repeated in the present embodiment. Similarly, historical output current values respectively corresponding to all photovoltaic strings included in the photovoltaic array may be obtained. For example, if the photovoltaic array includes 8 photovoltaic strings, historical output current values corresponding to the acquisition moment are determined to be $I_1 \sim I_8$.

As to the historical current discrete rate, firstly, a current discrete rate corresponding to the acquisition moment is calculated based on a plurality of historical output current values corresponding to the same acquisition moment. Similarly, a current discrete rate corresponding to each acquisition moment in a day may be acquired, so as to take a K percentile for the current discrete rate corresponding to each acquisition moment. A current discrete rate corresponding to the K percentile is regarded as the historical current discrete rate. The smaller the current discrete rate is, the better the power generation performance of the photovoltaic string is. Therefore, the K percentile takes a current discrete rate below a median. For example, if a median of the current discrete rate corresponding to each acquisition moment in a day is 8%, then a current discrete rate of which is less than 8% may be regarded as the historical current discrete rate.

Schematically, a relationship among the current discrete rate and the output current value of each photovoltaic string may be expressed as:

$$I_{ave} = \frac{\sum_{i=1}^{i=N} I_i}{N} \tag{4}$$

$$I_\sigma = \sqrt{\frac{\sum_{i=1}^{i=N}(I_i - I_{ave})^2}{N}} \tag{5}$$

$$CV_t = \frac{I_\sigma}{I_{ave}} \tag{6}$$

wherein $I_{ave}$ is the current average corresponding to the output current value of each photovoltaic string, $I_\sigma$ is the current standard deviation corresponding to the output current value of each photovoltaic string, $CV_t$ is the current discrete rate corresponding to the present acquisition moment, N is the number of photovoltaic strings, and $I_i$ represents the output current value corresponding to the $i^{th}$ photovoltaic string.

Schematically, a current average is obtained by substituting the historical output current value corresponding to each photovoltaic string into formula (4). A current standard deviation is obtained by substituting the obtained current average and the historical output current value into formula (5). Then, a current discrete rate corresponding to the acquisition moment is obtained by substituting the obtained current average and the current standard deviation into formula (6). Similarly, a current discrete rate corresponding to each acquisition moment in a day may be acquired, and a current discrete rate at the median or before the median is regarded as the historical current discrete rate, which may be expressed as $CV_{sd}$.

In step 406, a standard current discrete rate is calculated based on the historical current discrete rate and a failure current discrete rate.

Schematically, a relationship among the standard current discrete rate, the historical current discrete rate and the failure current discrete rate may be expressed as:

$$CV_{ts}=CV_{sd}aCV_{bd} \qquad (7)$$

wherein $CV_{ts}$ is the standard current discrete rate, $CV_{sd}$ is the historical current discrete rate, $CV_{bd}$ is the failure current discrete rate, usually 10%, and a is the empirical coefficient.

In a possible implementation, a standard current discrete rate for subsequent logical judgment may be obtained by substituting the obtained historical current discrete rate into formula (7).

It should be noted that the process of determining the standard characteristic current value, the standard irradiance, and the standard current discrete rate may not be carried out in the order shown in the above embodiment, but may be determined simultaneously, or may be determined in an order of determining the standard characteristic current value, the standard irradiance and the standard current discrete rate, and may also be determined in an order of determining the standard current discrete rate, the standard characteristic current value, and the standard irradiance. The present embodiment does not limit the order of determining each standard characteristic parameter value.

In the present embodiment, a first characteristic curve is fitted based on filtered historical output current values and acquisition moments, and a standard characteristic current value is determined based on an empirical coefficient and the first characteristic curve. A second characteristic curve is fitted based on the filtered historical output current values and filtered historical irradiances, and a standard irradiance is determined based on the determined standard characteristic current value and the second characteristic curve. A historical current discrete rate is obtained by analyzing and calculating the filtered historical output current values, and a standard current discrete rate is determined based on the obtained historical current discrete rate and a failure current discrete rate.

In a possible implementation, since an output current of a photovoltaic module may affected by morning and evening shade shielding and low irradiance, which may cause the output current value of the photovoltaic module to be low, such that the calculated current discrete rate is high and false alarms may occur. Therefore, in order to improve the accuracy of determining an operating state of a photovoltaic array, before determining the operating state of the photovoltaic array based on the current discrete rate, the output current value and irradiance need to be judged at first.

Figure 6:
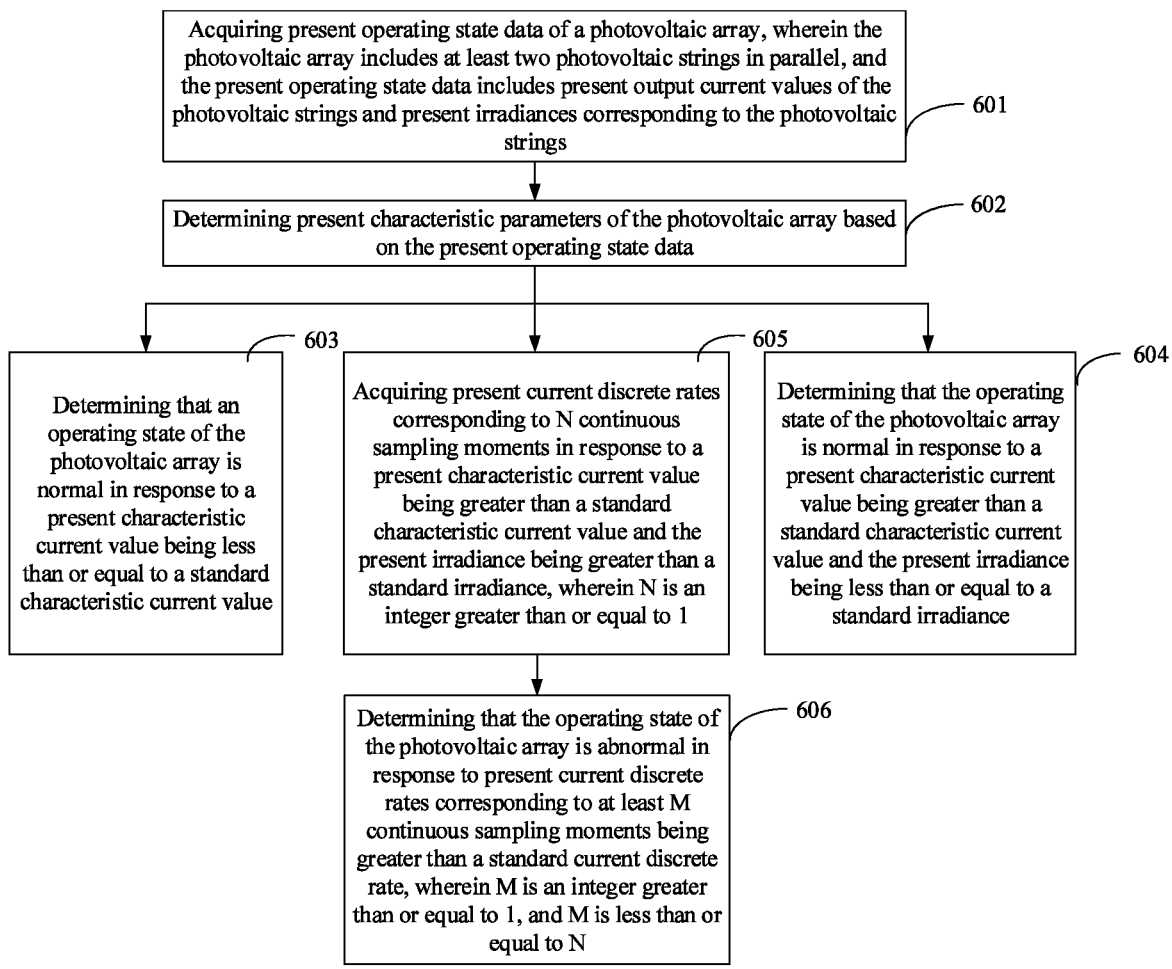
FIG. 6 shows a flowchart of a method for determining an operating state of a photovoltaic array according to another exemplary embodiment of the present disclosure.

Refer to FIG. 6, which shows a flowchart of a method for determining an operating state of a photovoltaic array according to another exemplary embodiment of the present disclosure. In the present embodiment, the method applicable to a computer device is taken as an example for illustration. The method includes the following steps.

In step 601, present operating state data of a photovoltaic array is acquired, wherein the photovoltaic array includes at least two photovoltaic strings in parallel, and the present operating state data includes present output current values of the photovoltaic strings and present irradiances corresponding to the photovoltaic strings.

For the implementation of this step, reference may be made to step 201, which is not repeated in the present embodiment.

In step 602, present characteristic parameters of the photovoltaic array are determined based on the present operating state data.

When a combiner device or an induction coil that detects an output current of a string fails, the acquired present output current values will be virtually high. If there is a virtually high current value in the acquired output current values, the calculated present current discrete rate will be high, which will affect the judgment of the operating state of the photovoltaic array. Therefore, before analyzing the present characteristic parameters based on the present operating state data, the present operating state data needs to be preprocessed, for example, to remove the virtually high current values in the present output current values.

Figure 7:
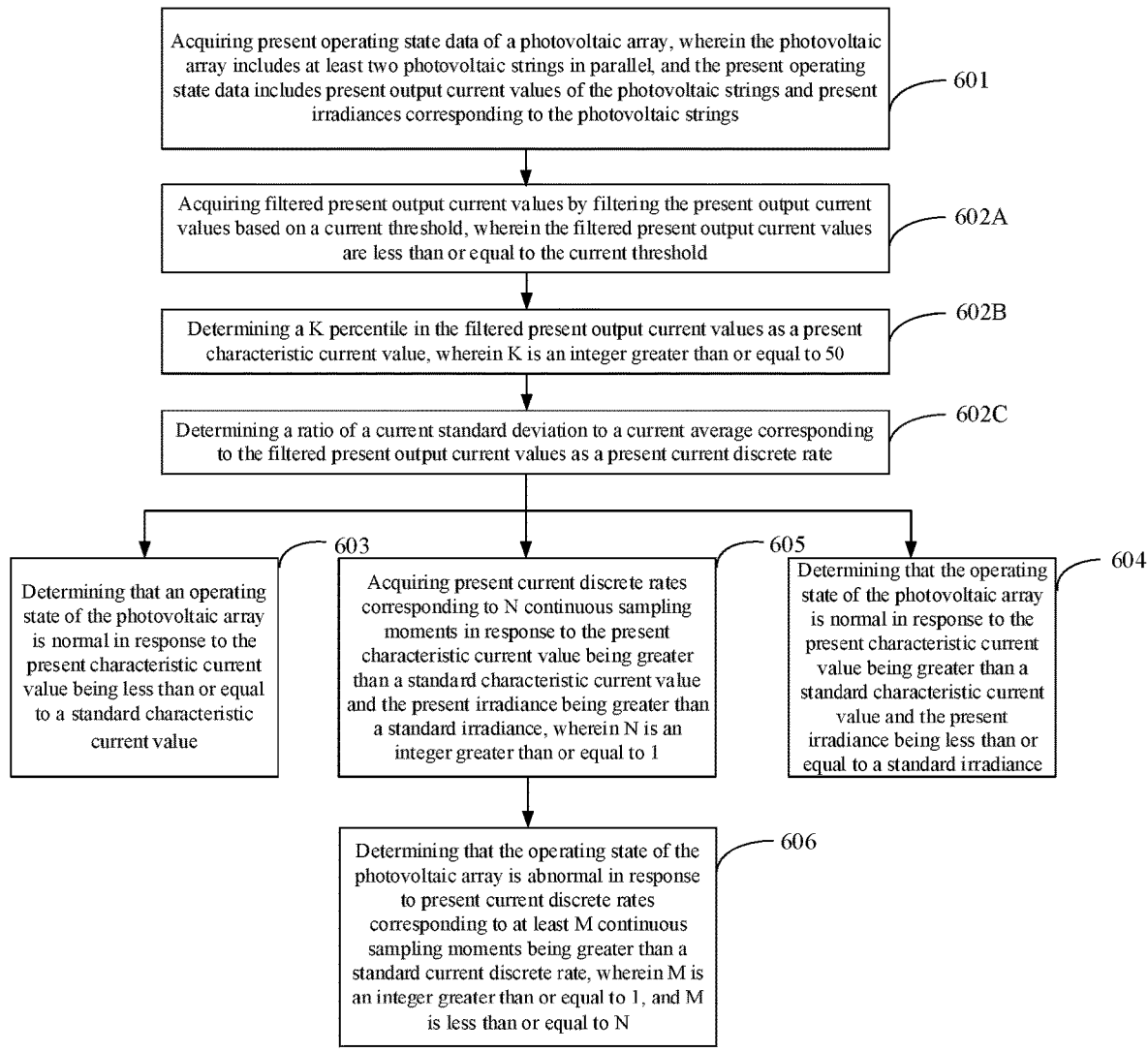
FIG. 7 shows a flowchart of a method for determining an operating state of a photovoltaic array according to yet another exemplary embodiment of the present disclosure.

Schematically, as shown in FIG. 7, step 602 may include step 602A, step 602B, and step 602C.

In step 602A, filtered present output current values are obtained by filtering the present output current values based on a current threshold, wherein the filtered present output current values are less than or equal to the current threshold.

For the method for determining the current threshold, reference may be made to the above embodiment, which are not repeated in the present embodiment.

In a possible implementation, if a plurality of present output current values are acquired at the same acquisition moment, the plurality of present output current values are filtered based on the current threshold. That is, the present output current values that are greater than the current threshold are removed, and there is no need to fill the vacancy values.

Schematically, for example, the acquired present output current value may be $I_1=10A$, $I_2=11A$, $I_3=10A$, $I_4=12A$, $I_5=10A$, $I_6=11A$, $I_7=20A$, $I_8=12A$, and the current threshold is $I_{threshold}=15A$. The present output current values may be filtered according to a relationship between the current threshold and the present output current values. Since $I_7>I_{threshold}$, the present output current value corresponding to 17 is removed.

As to the present output current value acquired in real-time, after the virtually high current values are removed, if a vacancy value exists, the vacancy value does not need to be filled. Only the remaining present output current values need to be subsequently analyzed. Also, if a virtually high current value exists, other alarms will be triggered, such as a combiner device failure alarm, an induction coil failure alarm, or the like, which have nothing to do with the photovoltaic array failure alarm in the present disclosure.

In step 602B, a K percentile in the filtered present output current values is determined as a present characteristic current value, wherein K is an integer greater than or equal to 50.

In a possible implementation, a K percentile in the present output current values with the virtually high current values removed is determined as a present characteristic current value. By default, when K is an integer greater than or equal to 50, the obtained present current characteristic current value is the output current value of the photovoltaic string in a normal operating state.

Schematically, if the filtered present output current values are $I_1=10A$, $I_2=11A$, $I_3=10A$, $I_4=12A$, $I_5=10A$, $I_6=11A$, and $I_8=12A$, then the present output current values are arranged in order. A median (K=50) is taken to obtain the present characteristic current value $I_K=11A$.

In step 602C, a ratio of a current standard deviation to a current average corresponding to the filtered present output current values is determined as a present current discrete rate.

In a possible implementation, a current average may be calculated based on the filtered present output current values and formula (4). A current standard deviation may be calculated based on the current average, the filtered present output current values and formula (5). Then a present current discrete rate may be calculated based on the current standard deviation, the current average and formula (6).

Schematically, if the filtered present output current values are $I_1=10A$, $I_2=11A$, $I_3=10A$, $I_4=12A$, $I_5=10A$, $I_6=11A$, and $I_8=12A$, then a current average $I_{ave}=10.86A$ may be obtained by substituting them into formula (4). A current standard deviation $I_\sigma=0.833A$ may be obtained by substituting the current average and the filtered present output current values into formula (5). Then a present current discrete rate $CV_t=0.077$ may be obtained by substituting the current standard deviation and the current average into formula (6), which is converted into a percentage, i.e., 7.7%.

In step 603, it is determined that an operating state of the photovoltaic array is normal in response to a present characteristic current value being less than or equal to a standard characteristic current value.

In a possible implementation, if the present characteristic current value is less than or equal to the standard characteristic current value, it indicates that the present output current value of the photovoltaic string is low, and the irradiance received by the photovoltaic module is low, which is not caused by the photovoltaic string failure. Therefore, it may be determined that the present operating state of the photovoltaic array is normal. That is, the operating state of the included photovoltaic strings is normal.

In step 604, it is determined that the operating state of the photovoltaic array is normal in response to a present characteristic current value being greater than a standard characteristic current value and the present irradiance being less than or equal to a standard irradiance.

In a possible implementation, if the present characteristic current value is greater than the standard characteristic current value, it is necessary to continue to judge whether the present irradiance is also less than or equal to the standard irradiance. If the present irradiance is less than or equal to the standard irradiance, it indicates the irradiance received by the photovoltaic module is low. In order to eliminate the situation of high current discrete rate caused by the low irradiance and avoid triggering false alarms, it should be output that the present operating state of the photovoltaic array is normal. That is, the operating state of the included photovoltaic strings is normal.

In step 605, present current discrete rates corresponding to N continuous sampling moments are acquired in response to a present characteristic current value being greater than a standard characteristic current value and the present irradiance being greater than a standard irradiance, wherein N is an integer greater than or equal to 1.

In a possible implementation, if the present characteristic current value is greater than the standard characteristic current value and the present irradiance is greater than the standard irradiance, it indicates that the irradiance received by the photovoltaic string is normal. In this case, the judgment of the present current discrete rate may be triggered.

As to the judgment of the current discrete rate, in order to eliminate false alarms caused by accidental factors, the present current discrete rates corresponding to N continuous sampling moments should be judged. That is, the present current discrete rates corresponding to N continuous sampling moments need to be acquired.

In step 606, it is determined that the operating state of the photovoltaic array is abnormal in response to present current discrete rates corresponding to at least M continuous sampling moments being greater than a standard current discrete rate, wherein M is an integer greater than or equal to 1, and M is less than or equal to N.

In a possible implementation, if the present sampling moment is moment a and the present current discrete rate corresponding to the acquisition moment a is greater than the standard current discrete rate, then moment a is marked as a first abnormal moment $t_1$, and a relationship between present characteristic parameters at the next acquisition moment (moment a+1) and the standard characteristic parameters is continuously judged. If the present current discrete rate corresponding to moment a+1 is also greater than the standard current discrete rate, moment a+1 is marked as a second abnormal moment $t_2$, and the above judging step is repeated. If the present current discrete rates corresponding to M continuous sampling moments are all greater than the standard current discrete rate, it is determined that an abnormal photovoltaic string exists in the photovoltaic array.

The time corresponding to the M continuous sampling moments may be a time difference between the $i^{th}$ abnormal moment and the first abnormal moment. That is, it needs to satisfy $t_i - T_1 \geq T_{ts}$ before outputting that an abnormal photovoltaic string exists in the photovoltaic array, wherein $t_1$ is the first abnormal moment, $t_i$ is the $i^{th}$ abnormal moment, and $T_{ts}$ is the time threshold.

Optionally, if the continuous abnormal moment is less than the time threshold, it should be output that the operating state of the photovoltaic array is normal.

Optionally, the time threshold may be set by the operation and maintenance personnel as needed. For example, the time threshold may be 15 min or 60 min.

In the present embodiment, present current output values acquired in real-time are filtered by a current threshold to remove the influence of virtually high current values on the calculation of the present current discrete rate. In addition, by firstly removing the situation where the present output current value is low due to a low irradiance of the photovoltaic module before judging the current discrete rate, false alarms caused by low output current values may be avoided, thereby improving the accuracy of determining an operating state of a photovoltaic array. Furthermore, by setting a time threshold, only when the time of the continuous abnormal moments satisfies the time threshold will a photovoltaic string abnormality alarm be triggered, which can avoid false alarms caused by accidental factors and improve the alarm accuracy.

In a possible implementation, when it is determined that the photovoltaic array is failed, the computer device may also generate an alarm record, so that the operation and maintenance personnel may determine which abnormal photovoltaic strings exist in the photovoltaic array based on the alarm record, inspect abnormal photovoltaic strings offline, and solve the problem that the operating state of the photovoltaic string is abnormal in time.

1. A minimum output current value of the present output current values corresponding to the M continuous sampling moments is determined.

If it is determined that an abnormal photovoltaic string exists in the photovoltaic array, a plurality of minimum output current values may be determined based on the present output current values corresponding to the M continuous sampling moments. For example, if M is 3, then a minimum current value of the present output current values corresponding to each sampling moment is determined, and 3 continuous sampling moments correspond to 3 minimum output current values.

2. A photovoltaic string corresponding to the minimum output current value is determined as an abnormal photovoltaic string.

Since the output current value is small and differs greatly from the present characteristic current value, the present current discrete rate is high. Therefore, a photovoltaic string corresponding to the minimum output current value is determined as an abnormal photovoltaic string, and the abnormal photovoltaic string information is regarded as an alarm content which is notified to the operation and maintenance personnel.

Optionally, the alarm record may include the present characteristic current value, the minimum output current value, the maximum output current value, and the abnormal photovoltaic string information corresponding to the abnormal acquisition moment.

In the present embodiment, an alarm record including information such as a minimum output current value, abnormal photovoltaic string information, a maximum output current value, and a present characteristic current value is generated, so as to promptly notify the operation and maintenance personnel to conduct offline inspections to solve the problem that an operating state of the photovoltaic string is abnormal.

Figure 8:
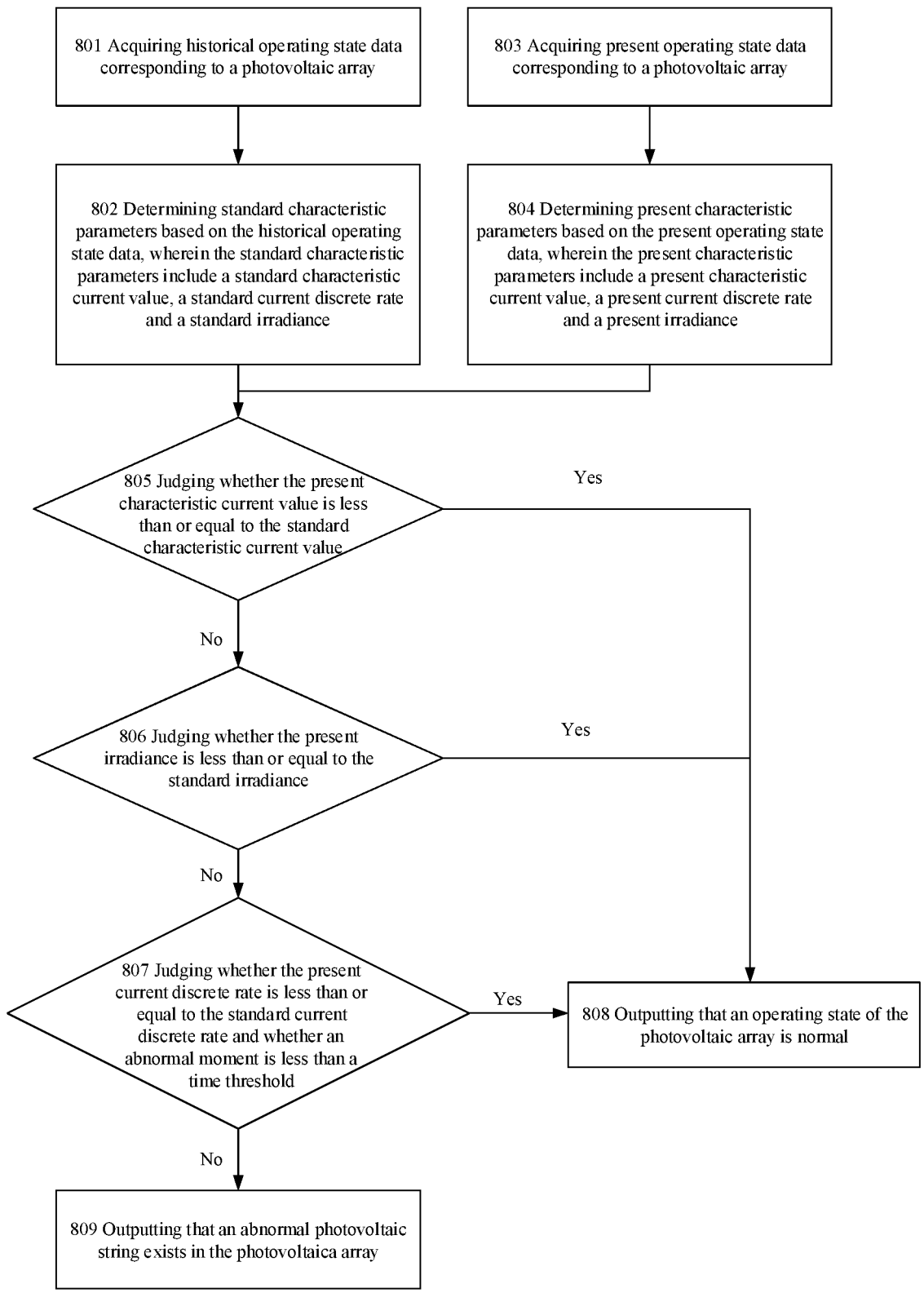
FIG. 8 shows a flowchart of a method for determining an operating state of a photovoltaic array according to still another exemplary embodiment of the present disclosure.

Refer to FIG. 8, which shows a flowchart of a method for determining an operating state of a photovoltaic array according to an exemplary embodiment of the present disclosure. The process may include the following steps.

In step 801, historical operating state data corresponding to a photovoltaic array is acquired.

In step 802, standard characteristic parameters are determined based on the historical operating state data, wherein the standard characteristic parameters include a standard characteristic current value, a standard current discrete rate and a standard irradiance.

In step 803, present operating state data corresponding to the photovoltaic array is acquired.

In step 804, present characteristic parameters are determined based on the present operating state data, wherein the present characteristic parameters include a present characteristic current value, a present current discrete rate, and a present irradiance.

In step 805, whether the present characteristic current value is less than or equal to the standard characteristic current value is judged.

In step 806, whether the present irradiance is less than or equal to the standard irradiance is judged.

In step 807, whether the present current discrete rate is less than or equal to the standard current discrete rate and whether an abnormal moment is less than a time threshold are judged.

In step 808, it is output that an operating state of the photovoltaic array is normal.

In step 809, it is output that an abnormal photovoltaic string exists in the photovoltaic array.

Figure 9:
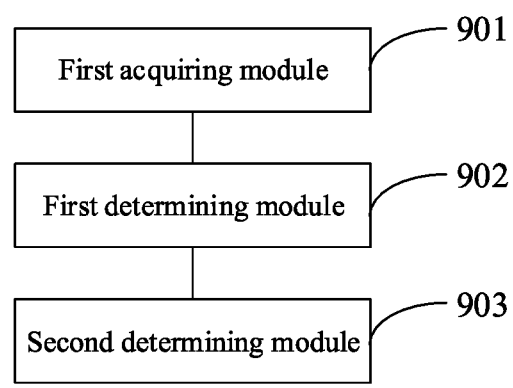
FIG. 9 shows a structural block diagram of an apparatus for determining an operating state of a photovoltaic array according to an exemplary embodiment of the present disclosure.

Refer to FIG. 9, which shows a structural block diagram of an apparatus for determining an operating state of a photovoltaic array according to an exemplary embodiment of the present disclosure. The apparatus may be implemented as all or part of a computer device through software, hardware or a combination thereof. The apparatus may include:

a first acquiring module 901, configured to acquire present operating state data of a photovoltaic array, wherein the photovoltaic array includes at least two photovoltaic strings in parallel, and the present operating state data includes present output current values of the photovoltaic strings and present irradiances corresponding to the photovoltaic strings;

a first determining module 902, configured to determine present characteristic parameters of the photovoltaic array based on the present operating state data, wherein the present characteristic parameters are intended to characterize characteristics of a present operating state of the photovoltaic array, and the present characteristic parameters include a present characteristic current value, a present current discrete rate and the present irradiances; and a second determining module 903, configured to determine an operating state of the photovoltaic array by comparing the present characteristic parameters with standard characteristic parameters of the photovoltaic array, wherein the standard characteristic parameters are determined based on historical operating state data of the photovoltaic array, and the standard characteristic parameters include a standard characteristic current value, a standard current discrete rate and a standard irradiance corresponding to the photovoltaic string.

Optionally, the second determining module 903 includes:

a first determining unit, configured to determine that the operating state of the photovoltaic array is normal in response to the present characteristic current value being less than or equal to the standard characteristic current value; and a second determining unit, configured to determine that the operating state of the photovoltaic array is normal in response to the present characteristic current value being greater than the standard characteristic current value and the present irradiance being less than or equal to the standard irradiance.

Optionally, the second determining module 903 further includes:

an acquiring unit, configured to acquire present current discrete rates corresponding to N continuous sampling moments in response to the present characteristic current value being greater than the standard characteristic current value and the present irradiance being greater than the standard irradiance, wherein N is an integer greater than or equal to 1; and a third determining unit, configured to determine that the operating state of the photovoltaic array is abnormal in response to present current discrete rates corresponding to at least M continuous sampling moments being greater than the standard current discrete rate, wherein M is an integer greater than or equal to 1, and M is less than or equal to N.

Optionally, the apparatus further includes:

a third determining module, configured to determine a minimum output current value of the present output current values corresponding to the M continuous sampling moments; and a fourth determining module, configured to determine a photovoltaic string corresponding to the minimum output current value as an abnormal photovoltaic string.

Optionally, the first determining module 902 includes:

a filtering unit, configured to obtain filtered present output current values by filtering the present output current values based on a current threshold, wherein the current threshold is determined based on the historical operating state data of the photovoltaic array, and the filtered present output current values are less than or equal to the current threshold;

a fourth determining unit, configured to determine a K percentile in the filtered present output current values as the present characteristic current value, wherein K is an integer greater than or equal to 50; and a fifth determining unit, configured to determine a ratio of a current standard deviation to a current average corresponding to the filtered present output current values as the present current discrete rate.

Optionally, the apparatus further includes:

a second acquiring module, configured to acquire the historical operating state data of the photovoltaic array within a preset time period, wherein the historical operating state data includes historical output current values of the photovoltaic strings, historical irradiances corresponding to the photovoltaic strings, and historical ambient temperatures and historical wind speeds of the environment where the photovoltaic strings are located;

a first calculating module, configured to calculate a photovoltaic module temperature corresponding to the photovoltaic array based on a maximum irradiance, a maximum wind speed and a maximum ambient temperature, wherein the maximum irradiance is determined based on the historical irradiances, the maximum ambient temperature is determined based on the historical ambient temperatures, and the maximum wind speed is determined based on the historical wind speeds;

a second calculating module, configured to calculate a first maximum output current value corresponding to the photovoltaic array based on the photovoltaic module temperature and the maximum irradiance, wherein the first maximum output current value is an output current value of the photovoltaic string under the maximum irradiance;

a third calculating module, configured to calculate a second maximum output current value corresponding to the photovoltaic array based on a rated installed capacity and a maximum system voltage, wherein the rated installed capacity is a rated power of a combiner connected to the photovoltaic array, the maximum system voltage is a system voltage of an inverter connected to the combiner, and the second maximum output current value is a maximum current value that the combiner allows the photovoltaic strings to input;

a fifth determining module, configured to determine a minimum value of the first maximum output current value and the second maximum output current value as a current threshold;

a filtering module, configured to obtain filtered historical operating state data by filtering the historical operating state data based on the current threshold, wherein the filtered historical output current values are less than or equal to the current threshold; and a sixth determining module, configured to determine the standard characteristic parameters based on the filtered historical operating state data.

Optionally, the sixth determining module includes:

a sixth determining unit, configured to construct a first characteristic curve based on the filtered historical output current values and acquisition moments corresponding to the filtered historical output current values, wherein the first characteristic curve characterizes a power generation performance of the photovoltaic array, and the first characteristic curve is a normal distribution curve; and to determine the standard characteristic current value based on the first characteristic curve and a preset empirical coefficient;

a seventh determining unit, configured to construct a second characteristic curve based on the filtered historical output current values and filtered historical irradiances, wherein the second characteristic curve is a linear curve; and to determine the standard irradiance based on the standard characteristic current value and the second characteristic curve; and a calculating unit, configured to calculate a historical current discrete rate of the photovoltaic array based on the filtered historical output current values; and to calculate the standard current discrete rate based on the historical current discrete rate and a failure current discrete rate.

In the embodiments of the present disclosure, present operating state data of a photovoltaic array (a present output current value of a photovoltaic string and a present irradiance corresponding to the photovoltaic string) is acquired in real-time, present characteristic parameters of the photovoltaic array (a present characteristic current value, a present current discrete rate and a present irradiance) are determined based on the present operating state data, and compare the present characteristic parameters with standard characteristic parameters of the photovoltaic array (a standard characteristic current value, a standard current discrete rate and a standard irradiance), so as to determine an operating state of the photovoltaic array. A present operating state of a photovoltaic array is determined by comparing present characteristic parameters determined based on real-time operating state data with standard characteristic parameters. Since present characteristic parameters can reflect operating state characteristics of a photovoltaic array in real-time, compared to a method for determining an operating state through an infrared image in the related arts, the interference of the ambient temperature on the infrared image can be avoided, thereby improving the accuracy of determining the operating state of the photovoltaic array.

Figure 10:
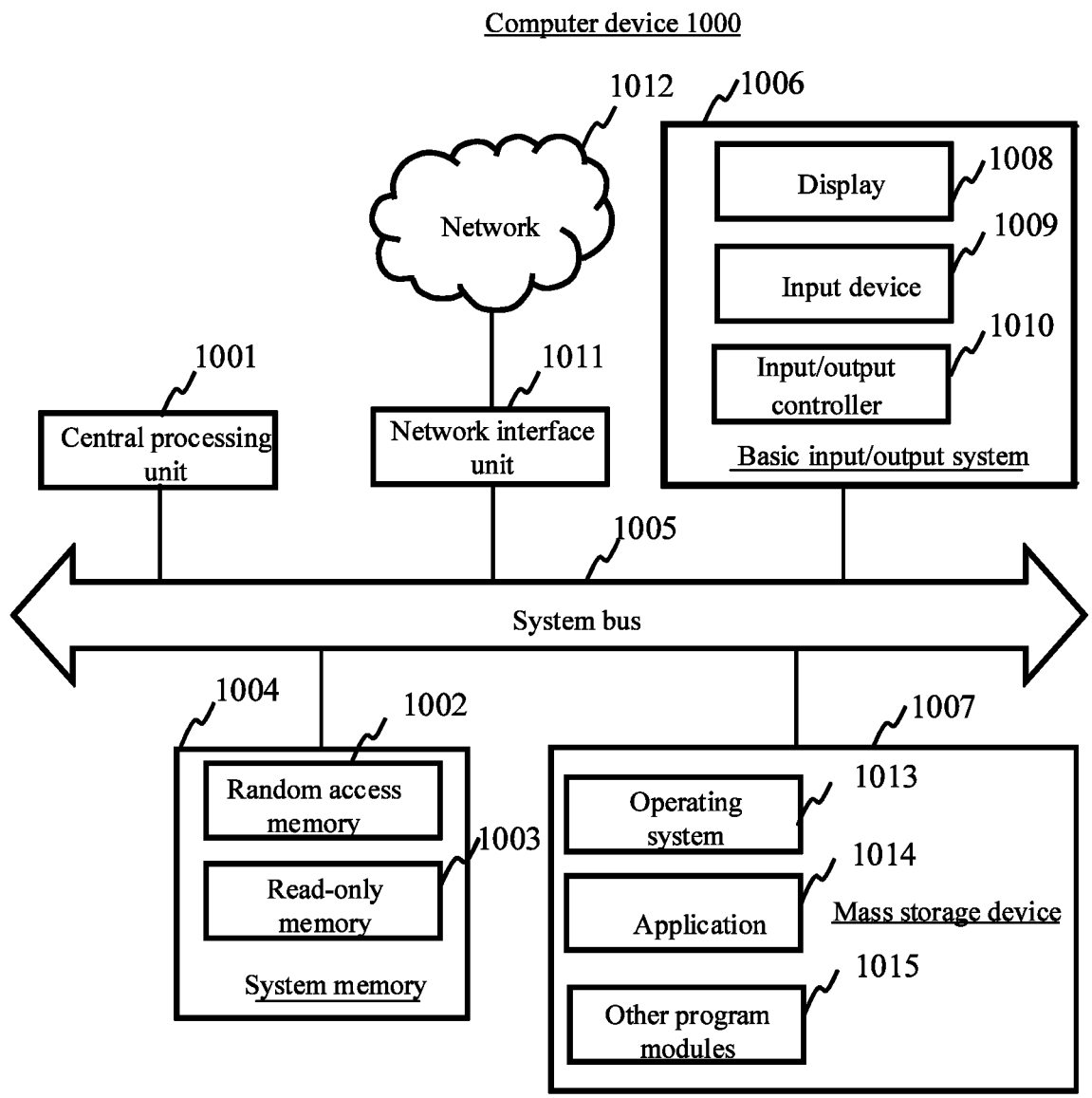
FIG. 10 shows a structural block diagram of a computer device according to an exemplary embodiment of the present disclosure.

Refer to FIG. 10, which shows a schematic structural diagram of a computer device according to an exemplary embodiment of the present disclosure. Specifically, the computer device 1000 includes a central processing unit (CPU) 1001, a system memory 1004 including a random access memory (RAM) 1002 and a read-only memory (ROM) 1003, and a system bus 1005 that connects the system memory 1004 and the central processing unit 1001. The computer device 1000 also includes a basic input/output (I/O) system 1006 that facilitates transmission of information between various components within the computer device, and a mass storage device 1007 for storing an operating system 1013, an application 1014, and other program modules 1015.

The basic input/output system 1006 includes a display 1008 for displaying information and an input device 1009 such as a mouse or a keyboard for user input of information. The display 1008 and the input device 1009 are both connected to the central processing unit 1001 via an input/output controller 1010 connected to the system bus 1005. The basic input/output system 1006 may further include the input/output controller 1010 for receiving and processing input from a plurality of other devices, such as a keyboard, a mouse, or an electronic stylus. Similarly, the input/output controller 1010 also provides output to a display screen, a printer, or other types of output devices.

The mass storage device 1007 is connected to the central processing unit 1001 by a mass storage controller (not shown) connected to the system bus 1005. The mass storage device 1007 and its associated computer-readable storage medium provide non-volatile storage for the computer device 1000. That is, the mass storage device 1007 may include a computer-readable storage medium (not shown) such as a hard disk or a compact disc read-only memory (CD-ROM) drive.

Without loss of generality, the computer-readable storage medium may include a computer storage medium and a communication medium. The computer storage medium includes volatile and nonvolatile, removable and non-removable medium implemented by any method or technology for storage of information such as computer-readable storage instructions, data structures, program modules, or other data. The computer storage medium includes an RAM, an ROM, an erasable programmable read-only memory (EPROM), an electrically erasable programmable read-only memory (EEPROM), a flash memory, or other solid-state storage technologies, a CD-ROM, a digital versatile disk (DVD) or other optical storage, a tape cassette, a magnetic tape, a magnetic disk storage or other magnetic storage devices. Of course, those skilled in the art may know that the computer storage medium is not limited to the above. The system memory 1004 and the mass storage device 1007 described above may be collectively referred to as a memory.

The memory stores one or more programs configured to be run by one or more central processing units 1001 and to include instructions for performing the above-mentioned method embodiments. The one or more programs, when executed by the central processing unit 1001, causes the central processing unit 1001 to perform the method according to the above method embodiments.

According to various embodiments of the present disclosure, the computer device 1000 may also be operated by being connected via a network such as the Internet to a remote network computer. That is, the computer device 1000 may be connected to a network 1012 by a network interface unit 1011 connected to the system bus 1005, or that is, the computer device 1000 may be connected to other types of networks or remote server systems (not shown) by using the network interface unit 1011.

The memory further includes one or more programs. The one or more programs stored in the memory include instructions configured to perform the steps performed by the computer device in the method according to the embodiments of the present disclosure.

A computer-readable storage medium is further provided by an embodiment of the present disclosure. The computer-readable storage medium stores at least one instruction therein. The at least one instruction, when loaded and executed by a processor, causes the processor to perform the method for determining an operating state of a photovoltaic array described in the above embodiments.

A computer program product is further provided by an embodiment of the present disclosure. The computer program product stores at least one instruction therein. The at least one instruction, when loaded and executed by a processor, causes the processor to perform the method for determining the operating state of the photovoltaic array described in the above embodiments.

Those skilled in the art may be aware that, in one or more of the foregoing examples, the functions described in the embodiments of the present disclosure may be implemented by hardware, software, firmware, or any combination thereof. When implemented by software, these functions may be stored in a computer-readable storage medium or transmitted as one or more instructions or codes on the computer-readable storage medium. The computer-readable storage medium includes a computer storage medium and a communication medium. The communication medium includes any medium that facilitates the transmission of a computer program from one place to another. The storage medium may be any available medium that may be accessed by a general-purpose or special-purpose computer.

The above are merely optional embodiments of the present disclosure, but are not intended to limit the present disclosure. Any modifications, equivalent replacements and improvements made within the spirits and principles of the present disclosure shall all fall in the protection scope of the present disclosure.

What is claimed is:

1. A method for determining an operating state of a photovoltaic array, comprising:

acquiring present operating state data of a photovoltaic array, wherein the photovoltaic array comprises at least two photovoltaic strings in parallel, and the present operating state data comprises present output current values of the at least two photovoltaic strings and present irradiances corresponding to the at least two photovoltaic strings;

determining present characteristic parameters of the photovoltaic array based on the present operating state data, wherein the present characteristic parameters characterize characteristics of a present operating state of the photovoltaic array, and the present characteristic parameters comprise a present characteristic current value, a present current discrete rate and the present irradiances; and determining an operating state of the photovoltaic array by comparing the present characteristic parameters with standard characteristic parameters of the photovoltaic array, wherein the standard characteristic parameters are determined based on historical operating state data of the photovoltaic array, and the standard characteristic parameters comprise a standard characteristic current value, a standard current discrete rate and a standard irradiance corresponding to the at least two photovoltaic strings;

wherein determining the present characteristic parameters of the photovoltaic array based on the present operating state data comprises:

acquiring filtered present output current values by filtering the present output current values based on a current threshold, wherein the current threshold is determined based on the historical operating state data of the photovoltaic array, and the filtered present output current values are less than or equal to the current threshold;

determining a K percentile in the filtered present output current values as the present characteristic current value, wherein K is an integer greater than or equal to 50; and determining a ratio of a current standard deviation to a current average corresponding to the filtered present output current values as the present current discrete rate.

2. The method according to claim 1, wherein determining the operating state of the photovoltaic array by comparing the present characteristic parameters with the standard characteristic parameters of the photovoltaic array comprises:
- determining that the operating state of the photovoltaic array is normal in response to the present characteristic current value being less than or equal to the standard characteristic current value; and
- determining that the operating state of the photovoltaic array is normal in response to the present characteristic current value being greater than the standard characteristic current value and the present irradiance being less than or equal to the standard irradiance.

3. The method according to claim 2, wherein before acquiring the present operating state data of the photovoltaic array, the method further comprises:
- acquiring the historical operating state data of the photovoltaic array within a preset time period, wherein the historical operating state data comprises historical output current values of the photovoltaic strings, historical irradiances corresponding to the at least two photovoltaic strings, and historical ambient temperatures and historical wind speeds of environment where the at least two photovoltaic strings are located;
- calculating a photovoltaic module temperature corresponding to the photovoltaic array based on a maximum irradiance, a maximum wind speed and a maximum ambient temperature, wherein the maximum irradiance is determined based on the historical irradiances, the maximum ambient temperature is determined based on the historical ambient temperatures, and the maximum wind speed is determined based on the historical wind speeds;
- calculating a first maximum output current value corresponding to the photovoltaic array based on the photovoltaic module temperature and the maximum irradiance, wherein the first maximum output current value is an output current value of the photovoltaic string under the maximum irradiance;
- calculating a second maximum output current value corresponding to the photovoltaic array based on a rated installed capacity and a maximum system voltage, wherein the rated installed capacity is a rated power of a combiner connected to the photovoltaic array, the maximum system voltage is a system voltage of an inverter connected to the combiner, and the second maximum output current value is a maximum current value that the combiner allows the photovoltaic strings to input;
- determining a minimum value of the first maximum output current value and the second maximum output current value as a current threshold;
- acquiring filtered historical operating state data by filtering the historical operating state data based on the current threshold, wherein the filtered historical output current values are less than or equal to the current threshold; and
- determining the standard characteristic parameters based on the filtered historical operating state data.

4. The method according to claim 2, wherein determining the operating state of the photovoltaic array by comparing the present characteristic parameters with the standard characteristic parameters of the photovoltaic array further comprises:
- acquiring present current discrete rates corresponding to N continuous sampling moments in response to the present characteristic current value being greater than the standard characteristic current value and the present irradiance being greater than the standard irradiance, wherein N is an integer greater than or equal to 1; and
- determining that the operating state of the photovoltaic array is abnormal in response to present current discrete rates corresponding to at least M continuous sampling moments being greater than the standard current discrete rate, wherein M is an integer greater than or equal to 1, and M is less than or equal to N.

5. The method according to claim 4, wherein before acquiring the present operating state data of the photovoltaic array, the method further comprises:
- acquiring the historical operating state data of the photovoltaic array within a preset time period, wherein the historical operating state data comprises historical output current values of the photovoltaic strings, historical irradiances corresponding to the at least two photovoltaic strings, and historical ambient temperatures and historical wind speeds of environment where the at least two photovoltaic strings are located;
- calculating a photovoltaic module temperature corresponding to the photovoltaic array based on a maximum irradiance, a maximum wind speed and a maximum ambient temperature, wherein the maximum irradiance is determined based on the historical irradiances, the maximum ambient temperature is determined based on the historical ambient temperatures, and the maximum wind speed is determined based on the historical wind speeds;
- calculating a first maximum output current value corresponding to the photovoltaic array based on the photovoltaic module temperature and the maximum irradiance, wherein the first maximum output current value is an output current value of the photovoltaic string under the maximum irradiance;
- calculating a second maximum output current value corresponding to the photovoltaic array based on a rated installed capacity and a maximum system voltage, wherein the rated installed capacity is a rated power of a combiner connected to the photovoltaic array, the maximum system voltage is a system voltage of an inverter connected to the combiner, and the second maximum output current value is a maximum current value that the combiner allows the photovoltaic strings to input;
- determining a minimum value of the first maximum output current value and the second maximum output current value as a current threshold;
- acquiring filtered historical operating state data by filtering the historical operating state data based on the current threshold, wherein the filtered historical output current values are less than or equal to the current threshold; and
- determining the standard characteristic parameters based on the filtered historical operating state data.

6. The method according to claim 4, wherein after determining that the operating state of the photovoltaic array is abnormal, the method further comprises:
- determining a minimum output current value of the present output current values corresponding to the M continuous sampling moments; and
- determining a photovoltaic string corresponding to the minimum output current value as an abnormal photovoltaic string.

7. The method according to claim 6, wherein before acquiring the present operating state data of the photovoltaic array, the method further comprises:

acquiring the historical operating state data of the photovoltaic array within a preset time period, wherein the historical operating state data comprises historical output current values of the photovoltaic strings, historical irradiances corresponding to the at least two photovoltaic strings, and historical ambient temperatures and historical wind speeds of environment where the at least two photovoltaic strings are located;

calculating a photovoltaic module temperature corresponding to the photovoltaic array based on a maximum irradiance, a maximum wind speed and a maximum ambient temperature, wherein the maximum irradiance is determined based on the historical irradiances, the maximum ambient temperature is determined based on the historical ambient temperatures, and the maximum wind speed is determined based on the historical wind speeds;

calculating a first maximum output current value corresponding to the photovoltaic array based on the photovoltaic module temperature and the maximum irradiance, wherein the first maximum output current value is an output current value of the photovoltaic string under the maximum irradiance;

calculating a second maximum output current value corresponding to the photovoltaic array based on a rated installed capacity and a maximum system voltage, wherein the rated installed capacity is a rated power of a combiner connected to the photovoltaic array, the maximum system voltage is a system voltage of an inverter connected to the combiner, and the second maximum output current value is a maximum current value that the combiner allows the photovoltaic strings to input;

determining a minimum value of the first maximum output current value and the second maximum output current value as a current threshold;

acquiring filtered historical operating state data by filtering the historical operating state data based on the current threshold, wherein the filtered historical output current values are less than or equal to the current threshold; and determining the standard characteristic parameters based on the filtered historical operating state data.

8. The method according to claim 1, wherein before acquiring the present operating state data of the photovoltaic array, the method further comprises:

acquiring the historical operating state data of the photovoltaic array within a preset time period, wherein the historical operating state data comprises historical output current values of the photovoltaic strings, historical irradiances corresponding to the at least two photovoltaic strings, and historical ambient temperatures and historical wind speeds of environment where the at least two photovoltaic strings are located;

calculating a photovoltaic module temperature corresponding to the photovoltaic array based on a maximum irradiance, a maximum wind speed and a maximum ambient temperature, wherein the maximum irradiance is determined based on the historical irradiances, the maximum ambient temperature is determined based on the historical ambient temperatures, and the maximum wind speed is determined based on the historical wind speeds;

calculating a first maximum output current value corresponding to the photovoltaic array based on the photovoltaic module temperature and the maximum irradiance, wherein the first maximum output current value is an output current value of the photovoltaic string under the maximum irradiance;

calculating a second maximum output current value corresponding to the photovoltaic array based on a rated installed capacity and a maximum system voltage, wherein the rated installed capacity is a rated power of a combiner connected to the photovoltaic array, the maximum system voltage is a system voltage of an inverter connected to the combiner, and the second maximum output current value is a maximum current value that the combiner allows the photovoltaic strings to input;

determining a minimum value of the first maximum output current value and the second maximum output current value as a current threshold;

acquiring filtered historical operating state data by filtering the historical operating state data based on the current threshold, wherein the filtered historical output current values are less than or equal to the current threshold; and determining the standard characteristic parameters based on the filtered historical operating state data.

9. The method according to claim 8, wherein determining the standard characteristic parameter based on the filtered historical operating state data comprises:

constructing a first characteristic curve based on the filtered historical output current values and acquisition moments corresponding to the filtered historical output current values, wherein the first characteristic curve characterizes a power generation performance of the photovoltaic array, and the first characteristic curve is a normal distribution curve; and determining the standard characteristic current value based on the first characteristic curve and a preset empirical coefficient;

constructing a second characteristic curve based on the filtered historical output current values and filtered historical irradiances, wherein the second characteristic curve is a linear curve; and determining the standard irradiance based on the standard characteristic current value and the second characteristic curve; and calculating a historical current discrete rate of the photovoltaic array based on the filtered historical output current values; and calculating the standard current discrete rate based on the historical current discrete rate and a failure current discrete rate.

10. An apparatus for determining an operating state of a photovoltaic array, comprising:

an acquiring module, configured to acquire present operating state data of a photovoltaic array, wherein the photovoltaic array comprises at least two photovoltaic strings in parallel, and the present operating state data comprises present output current values of the at least two photovoltaic strings and present irradiances corresponding to the at least two photovoltaic strings;

a first determining module, configured to determine present characteristic parameters of the photovoltaic array based on the present operating state data, wherein the present characteristic parameters characterize characteristics of a present operating state of the photovoltaic array, and the present characteristic parameters comprise a present characteristic current value, a present current discrete rate and the present irradiances; and a second determining module, configured to determine an operating state of the photovoltaic array by comparing the present characteristic parameters with standard characteristic parameters of the photovoltaic array, wherein the standard characteristic parameters are determined based on historical operating state data of the photovoltaic array, and the standard characteristic parameters comprise a standard characteristic current value, a standard current discrete rate and a standard irradiance corresponding to the at least two photovoltaic strings;

a filtering unit included in the first determining module and configured to obtain filtered present output current values by filtering the present output current values based on a current threshold, wherein the current threshold is determined based on the historical operating state data of the photovoltaic array, and the filtered present output current values are less than or equal to the current threshold;

a first determining unit included in the first determining module and configured to determine a K percentile in the filtered present output current values as the present characteristic current value, wherein K is an integer greater than or equal to 50; and a second determining unit included in the first determining module and configured to determine a ratio of a current standard deviation to a current average corresponding to the filtered present output current values as the present current discrete rate.

11. A computer device, comprising:
a processor; and
a memory storing at least one instruction, at least one program, a code set or an instruction set therein, wherein the at least one instruction, the at least one program, the code set or the instruction set, when loaded and executed by the processor, causes the processor to perform a method for determining an operating state of the photovoltaic array wherein the method comprises:
  acquiring present operating state data of a photovoltaic array, wherein the photovoltaic array comprises at least two photovoltaic strings in parallel, and the present operating state data comprises present output current values of the at least two photovoltaic strings and present irradiances corresponding to the at least two photovoltaic strings;
  determining present characteristic parameters of the photovoltaic array based on the present operating state data, wherein the present characteristic parameters characterize characteristics of a present operating state of the photovoltaic array, and the present characteristic parameters comprise a present characteristic current value, a present current discrete rate and the present irradiances; and
  determining an operating state of the photovoltaic array by comparing the present characteristic parameters with standard characteristic parameters of the photovoltaic array, wherein the standard characteristic parameters are determined based on historical operating state data of the photovoltaic array, and the standard characteristic parameters comprise a standard characteristic current value, a standard current discrete rate and a standard irradiance corresponding to the at least two photovoltaic strings;
  wherein determining the present characteristic parameters of the photovoltaic array based on the present operating state data comprises:
    acquiring filtered present output current values by filtering the present output current values based on a current threshold, wherein the current threshold is determined based on the historical operating state data of the photovoltaic array, and the filtered present output current values are less than or equal to the current threshold;
    determining a K percentile in the filtered present output current values as the present characteristic current value, wherein K is an integer greater than or equal to 50; and
    determining a ratio of a current standard deviation to a current average corresponding to the filtered present output current values as the present current discrete rate.

12. The computer device of claim 11, wherein determining the operating state of the photovoltaic array by comparing the present characteristic parameters with the standard characteristic parameters of the photovoltaic array comprises:
  determining that the operating state of the photovoltaic array is normal in response to the present characteristic current value being less than or equal to the standard characteristic current value; and
  determining that the operating state of the photovoltaic array is normal in response to the present characteristic current value being greater than the standard characteristic current value and the present irradiance being less than or equal to the standard irradiance.

13. The computer device according to claim 12, wherein determining the operating state of the photovoltaic array by comparing the present characteristic parameters with the standard characteristic parameters of the photovoltaic array further comprises:
  acquiring present current discrete rates corresponding to N continuous sampling moments in response to the present characteristic current value being greater than the standard characteristic current value and the present irradiance being greater than the standard irradiance, wherein N is an integer greater than or equal to 1; and
  determining that the operating state of the photovoltaic array is abnormal in response to present current discrete rates corresponding to at least M continuous sampling moments being greater than the standard current discrete rate, wherein M is an integer greater than or equal to 1, and M is less than or equal to N.

14. The computer device according to claim 13, wherein after determining that the operating state of the photovoltaic array is abnormal, the method further comprises:
  determining a minimum output current value of the present output current values corresponding to the M continuous sampling moments; and
  determining a photovoltaic string corresponding to the minimum output current value as an abnormal photovoltaic string.

15. The computer device according to claim 11, wherein before acquiring the present operating state data of the photovoltaic array, the method further comprises:
  acquiring the historical operating state data of the photovoltaic array within a preset time period, wherein the historical operating state data comprises historical output current values of the photovoltaic strings, historical irradiances corresponding to the at least two photovoltaic strings, and historical ambient temperatures and historical wind speeds of environment where the at least two photovoltaic strings are located;
  calculating a photovoltaic module temperature corresponding to the photovoltaic array based on a maximum irradiance, a maximum wind speed and a maximum ambient temperature, wherein the maximum irradiance is determined based on the historical irradiances, the maximum ambient temperature is determined based on the historical ambient temperatures, and the maximum wind speed is determined based on the historical wind speeds;

calculating a first maximum output current value corresponding to the photovoltaic array based on the photovoltaic module temperature and the maximum irradiance, wherein the first maximum output current value is an output current value of the photovoltaic string under the maximum irradiance;

calculating a second maximum output current value corresponding to the photovoltaic array based on a rated installed capacity and a maximum system voltage, wherein the rated installed capacity is a rated power of a combiner connected to the photovoltaic array, the maximum system voltage is a system voltage of an inverter connected to the combiner, and the second maximum output current value is a maximum current value that the combiner allows the photovoltaic strings to input;

determining a minimum value of the first maximum output current value and the second maximum output current value as a current threshold;

acquiring filtered historical operating state data by filtering the historical operating state data based on the current threshold, wherein the filtered historical output current values are less than or equal to the current threshold; and determining the standard characteristic parameters based on the filtered historical operating state data.

16. The computer device according to claim 15, wherein determining the standard characteristic parameter based on the filtered historical operating state data comprises:

constructing a first characteristic curve based on the filtered historical output current values and acquisition moments corresponding to the filtered historical output current values, wherein the first characteristic curve characterizes a power generation performance of the photovoltaic array, and the first characteristic curve is a normal distribution curve; and determining the standard characteristic current value based on the first characteristic curve and a preset empirical coefficient;

constructing a second characteristic curve based on the filtered historical output current values and filtered historical irradiances, wherein the second characteristic curve is a linear curve; and determining the standard irradiance based on the standard characteristic current value and the second characteristic curve; and calculating a historical current discrete rate of the photovoltaic array based on the filtered historical output current values; and calculating the standard current discrete rate based on the historical current discrete rate and a failure current discrete rate.

17. A computer-readable storage medium, storing at least one instruction, at least one program, a code set or an instruction set therein, wherein the at least one instruction, the at least one program, the code set or the instruction set, when loaded and executed by a processor, causes the processor to perform a method for determining the operating state of a photovoltaic array wherein the method comprises:

acquiring present operating state data of a photovoltaic array, wherein the photovoltaic array comprises at least two photovoltaic strings in parallel, and the present operating state data comprises present output current values of the at least two photovoltaic strings and present irradiances corresponding to the at least two photovoltaic strings;

determining present characteristic parameters of the photovoltaic array based on the present operating state data, wherein the present characteristic parameters characterize characteristics of a present operating state of the photovoltaic array, and the present characteristic parameters comprise a present characteristic current value, a present current discrete rate and the present irradiances; and determining an operating state of the photovoltaic array by comparing the present characteristic parameters with standard characteristic parameters of the photovoltaic array, wherein the standard characteristic parameters are determined based on historical operating state data of the photovoltaic array, and the standard characteristic parameters comprise a standard characteristic current value, a standard current discrete rate and a standard irradiance corresponding to the at least two photovoltaic strings;

wherein determining the present characteristic parameters of the photovoltaic array based on the present operating state data comprises:

acquiring filtered present output current values by filtering the present output current values based on a current threshold, wherein the current threshold is determined based on the historical operating state data of the photovoltaic array, and the filtered present output current values are less than or equal to the current threshold;

determining a K percentile in the filtered present output current values as the present characteristic current value, wherein K is an integer greater than or equal to 50; and determining a ratio of a current standard deviation to a current average corresponding to the filtered present output current values as the present current discrete rate.

18. The computer-readable storage medium of claim 17, wherein determining the operating state of the photovoltaic array by comparing the present characteristic parameters with the standard characteristic parameters of the photovoltaic array comprises:

determining that the operating state of the photovoltaic array is normal in response to the present characteristic current value being less than or equal to the standard characteristic current value; and determining that the operating state of the photovoltaic array is normal in response to the present characteristic current value being greater than the standard characteristic current value and the present irradiance being less than or equal to the standard irradiance.

19. The computer-readable storage medium according to claim 18, wherein determining the operating state of the photovoltaic array by comparing the present characteristic parameters with the standard characteristic parameters of the photovoltaic array further comprises:

acquiring present current discrete rates corresponding to N continuous sampling moments in response to the present characteristic current value being greater than the standard characteristic current value and the present irradiance being greater than the standard irradiance, wherein N is an integer greater than or equal to 1; and determining that the operating state of the photovoltaic array is abnormal in response to present current discrete rates corresponding to at least M continuous sampling moments being greater than the standard current discrete rate, wherein M is an integer greater than or equal to 1, and M is less than or equal to N.

20. The computer-readable storage medium according to claim 19, wherein after determining that the operating state of the photovoltaic array is abnormal, the method further comprises:

determining a minimum output current value of the present output current values corresponding to the M continuous sampling moments; and determining a photovoltaic string corresponding to the minimum output current value as an abnormal photovoltaic string.

21. The computer-readable storage medium according to claim 17, wherein before acquiring the present operating state data of the photovoltaic array, the method further comprises:

acquiring the historical operating state data of the photovoltaic array within a preset time period, wherein the historical operating state data comprises historical output current values of the photovoltaic strings, historical irradiances corresponding to the at least two photovoltaic strings, and historical ambient temperatures and historical wind speeds of environment where the at least two photovoltaic strings are located;

calculating a photovoltaic module temperature corresponding to the photovoltaic array based on a maximum irradiance, a maximum wind speed and a maximum ambient temperature, wherein the maximum irradiance is determined based on the historical irradiances, the maximum ambient temperature is determined based on the historical ambient temperatures, and the maximum wind speed is determined based on the historical wind speeds;

calculating a first maximum output current value corresponding to the photovoltaic array based on the photovoltaic module temperature and the maximum irradiance, wherein the first maximum output current value is an output current value of the photovoltaic string under the maximum irradiance;

calculating a second maximum output current value corresponding to the photovoltaic array based on a rated installed capacity and a maximum system voltage, wherein the rated installed capacity is a rated power of a combiner connected to the photovoltaic array, the maximum system voltage is a system voltage of an inverter connected to the combiner, and the second maximum output current value is a maximum current value that the combiner allows the photovoltaic strings to input;

determining a minimum value of the first maximum output current value and the second maximum output current value as a current threshold;

acquiring filtered historical operating state data by filtering the historical operating state data based on the current threshold, wherein the filtered historical output current values are less than or equal to the current threshold; and determining the standard characteristic parameters based on the filtered historical operating state data.

22. The computer-readable storage medium according to claim 21, wherein determining the standard characteristic parameter based on the filtered historical operating state data comprises:

constructing a first characteristic curve based on the filtered historical output current values and acquisition moments corresponding to the filtered historical output current values, wherein the first characteristic curve characterizes a power generation performance of the photovoltaic array, and the first characteristic curve is a normal distribution curve; and determining the standard characteristic current value based on the first characteristic curve and a preset empirical coefficient;

constructing a second characteristic curve based on the filtered historical output current values and filtered historical irradiances, wherein the second characteristic curve is a linear curve;

and determining the standard irradiance based on the standard characteristic current value and the second characteristic curve; and calculating a historical current discrete rate of the photovoltaic array based on the filtered historical output current values; and calculating the standard current discrete rate based on the historical current discrete rate and a failure current discrete rate.

* * * * *